US012202290B2

(12) United States Patent
Yamada et al.

(10) Patent No.: US 12,202,290 B2
(45) Date of Patent: Jan. 21, 2025

(54) PRINTING APPARATUS AND PRINT CONTROL METHOD

(71) Applicant: CANON KABUSHIKI KAISHA, Tokyo (JP)

(72) Inventors: Akitoshi Yamada, Kanagawa (JP); Yumi Yanai, Kanagawa (JP); Fumitaka Goto, Tokyo (JP); Tomokazu Ishikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 277 days.

(21) Appl. No.: 17/864,740

(22) Filed: Jul. 14, 2022

(65) Prior Publication Data

US 2022/0355603 A1 Nov. 10, 2022

Related U.S. Application Data

(63) Continuation of application No. PCT/JP2021/003071, filed on Jan. 28, 2021.

(30) Foreign Application Priority Data

Jan. 30, 2020 (JP) ................................ 2020-013877
Dec. 23, 2020 (JP) ................................ 2020-214165

(51) Int. Cl.
*B41J 2/355* (2006.01)
*B41J 2/325* (2006.01)
(Continued)

(52) U.S. Cl.
CPC ................ *B41M 5/34* (2013.01); *B41J 2/325* (2013.01); *B41J 2/35* (2013.01); *B41J 2/355* (2013.01);
(Continued)

(58) Field of Classification Search
CPC ...... B41M 5/34; B41M 2205/42; B41J 2/325; B41J 2/35; B41J 2/355; B41J 2/3556;
(Continued)

(56) References Cited

U.S. PATENT DOCUMENTS 5,774,162 A * 6/1998 Fukuda ...................... B41J 2/32
347/175
6,934,043 B1 * 8/2005 Sugiyama .......... H04N 1/00326
358/448
(Continued)

FOREIGN PATENT DOCUMENTS

JP H03-043293 A 2/1991
JP H09-001841 A 1/1997
(Continued)

OTHER PUBLICATIONS

International Search Report issued by the Japan Patent Office on Apr. 13, 2021 in corresponding International Application No. PCT/JP2021/003071, with English translation.
(Continued)

*Primary Examiner* — Kristal Feggins
(74) *Attorney, Agent, or Firm* — Carter, DeLuca & Farrell LLP

(57) ABSTRACT

A printing apparatus heats a print medium in which color development layers that develop colors in accordance with heating are stacked in correspondence with a plurality of color. The apparatus includes a drive unit configured to drive each of heating elements of a printhead using a first pulse for preheating a predetermined color development layer, and a second pulse applied after the first pulse to cause the predetermined color development layer to develop the color, and a pulse control unit configured to, when developing a specific color, perform a control in which a pulse width of the first pulse is increased and/or a control in which the number of times of application of the second pulse is
(Continued)

increased such that another color development layer that is not used to reproduce the specific color does not develop the color.

23 Claims, 31 Drawing Sheets

(51) Int. Cl.
*B41J 2/35* (2006.01)
*B41M 5/34* (2006.01)

(52) U.S. Cl.
CPC ........ *B41J 2/3556* (2013.01); *B41M 2205/42* (2013.01)

(58) Field of Classification Search
CPC ...... B41J 2/32; B41J 2/38; B41J 2/315; B41F 16/00; B41F 16/0006
See application file for complete search history.

(56) References Cited

U.S. PATENT DOCUMENTS

| | | | |
|---|---|---|---|
| 10,027,848 | B2 | 7/2018 | Fuse et al. |
| 10,043,118 | B2 | 8/2018 | Sumi et al. |
| 10,356,282 | B2 | 7/2019 | Ochiai et al. |
| 11,321,596 | B2 | 5/2022 | Takesue et al. |
| 2011/0050829 | A1 | 3/2011 | Busch |
| 2022/0222498 | A1 | 7/2022 | Takesue et al. |
| 2022/0324247 | A1 | 10/2022 | Yamada et al. |

FOREIGN PATENT DOCUMENTS

| | | | |
|---|---|---|---|
| JP | 4677431 | B2 | 4/2011 |
| JP | 2011-523914 | A | 8/2011 |
| JP | 2013-506582 | A | 2/2013 |
| JP | 2015-058676 | A | 3/2015 |
| JP | 2017-052261 | A | 3/2017 |
| WO | 2009/151905 | A1 | 12/2009 |
| WO | 2011/044049 | A1 | 4/2011 |

OTHER PUBLICATIONS

Notice of Reasons for Refusal issued by the Japanese Patent Office on Oct. 15, 2024 in corresponding JP Patent Application No. 2020-214165, with English translation.

* cited by examiner

FIG. 26

| PIXEL VALUE AT IMAGE START END IA | | | | CORRECTED VALUES IN IMMEDIATELY PRECEDING PIXEL REGION IW | | |
|---|---|---|---|---|---|---|
| COLOR | R | G | B | R | G | B |
| K | 0 | 0 | 0 | 240 | 240 | 240 |
| . | . | . | . | . | . | . |
| . | . | . | . | . | . | . |
| . | . | . | . | . | . | . |
| B | 0 | 0 | 255 | 196 | 196 | 255 |
| . | . | . | . | . | . | . |
| . | . | . | . | . | . | . |
| . | . | . | . | . | . | . |
| G | 0 | 255 | 0 | 128 | 255 | 128 |
| . | . | . | . | . | . | . |
| . | . | . | . | . | . | . |
| . | . | . | . | . | . | . |
| C | 0 | 255 | 255 | 128 | 255 | 255 |
| . | . | . | . | . | . | . |
| . | . | . | . | . | . | . |
| . | . | . | . | . | . | . |
| R | 255 | 0 | 0 | 255 | 240 | 240 |
| . | . | . | . | . | . | . |
| . | . | . | . | . | . | . |
| . | . | . | . | . | . | . |
| M | 255 | 0 | 255 | 255 | 196 | 255 |
| . | . | . | . | . | . | . |
| . | . | . | . | . | . | . |
| . | . | . | . | . | . | . |
| Y | 255 | 255 | 0 | 255 | 255 | 240 |
| . | . | . | . | . | . | . |
| . | . | . | . | . | . | . |
| . | . | . | . | . | . | . |
| W | 255 | 255 | 255 | 255 | 255 | 255 |

FIG. 28

| n LINE PIXEL | | | | (n+1) LINE PIXEL | | | | PREHEATING INSTRUCTION | TABLE GROUP NUMBER |
|---|---|---|---|---|---|---|---|---|---|
| COLOR | R | G | B | COLOR | R | G | B | | |
| K | 0 | 0 | 0 | K | 0 | 0 | 0 | NOT PREHEAT | 0 |
| · | · | · | · | · | · | · | · | · | · |
| · | · | · | · | · | · | · | · | · | · |
| · | · | · | · | · | · | · | · | · | · |
| K | 0 | 0 | 0 | C | 0 | 255 | 255 | NOT PREHEAT | 0 |
| · | · | · | · | · | · | · | · | · | · |
| · | · | · | · | · | · | · | · | · | · |
| · | · | · | · | · | · | · | · | · | · |
| Y | 255 | 255 | 0 | C | 0 | 255 | 255 | PREHEAT | 12 |
| · | · | · | · | · | · | · | · | · | · |
| · | · | · | · | · | · | · | · | · | · |
| · | · | · | · | · | · | · | · | · | · |
| W | 255 | 255 | 255 | Y | 255 | 255 | 0 | PREHEAT | 21 |
| · | · | · | · | · | · | · | · | · | · |
| · | · | · | · | · | · | · | · | · | · |
| · | · | · | · | · | · | · | · | · | · |
| W | 255 | 255 | 255 | Y | 255 | 255 | 255 | PREHEAT | 0 |

PRINTING APPARATUS AND PRINT CONTROL METHOD

CROSS-REFERENCE TO RELATED APPLICATIONS

This application is a Continuation of International Patent Application No. PCT/JP2021/003071, filed Jan. 28, 2021, which claims the benefit of Japanese Patent Application No. 2020-013877, filed Jan. 30, 2020 and Japanese Patent Application No. 2020-214165, filed Dec. 23, 2020 all of which are hereby incorporated by reference herein in their entirety.

BACKGROUND OF THE INVENTION

Field of the Invention

The present invention relates to a printing apparatus and a print control method and, more particularly, to, for example, a printing apparatus that performs image printing by heating, by a heating element, a print medium formed by stacking color development layers of different colors, and a print control method.

Description of the Related Art

In printing using a thermal printhead, conventionally, monochrome printing using thermal paper, color printing using an ink ribbon, and the like have widely been used. On the other hand, in recent years, color printing using a paper sheet including color development layers of a plurality of colors has been proposed and proliferated as a print means for simple photos. The color development layers of the plurality of colors need different heating temperatures and heating times to develop the colors. Using the difference, specific color development layers are caused to develop the colors, thereby printing a color image (see Japanese Patent Laid-Open No. 2013-506582 and Japanese Patent No. 4677431).

In the above-described conventional technique, however, since the pulse width of a head drive pulse used to cause each color development layer to develop the color is fixed, pulse application needs to be done a plurality of times to develop a specific color with a high color development temperature, and heating takes time.

SUMMARY OF THE INVENTION

The present invention provides a technique capable of implementing printing of high color development properties while shortening a heating time needed to develop a specific color.

According to an aspect of the present invention, there is provided a printing apparatus configured to heat a sheet-shaped print medium in which a plurality of color development layers that develop colors in accordance with heating are stacked in correspondence with a plurality of colors so as to form an image on the print medium by causing a desired color development layer in the plurality of color development layers to independently develop the color, the apparatus comprising: a printhead including a plurality of heating elements; a drive unit configured to drive each of the plurality of heating elements of the printhead using a first pulse for preheating a predetermined color development layer, and a second pulse applied after the first pulse to cause the predetermined color development layer to develop the color; and a pulse control unit configured to, when developing a specific color, perform a control in which a pulse width of the first pulse is increased and/or a control in which the number of times of application of the second pulse is increased such that another color development layer that is not used to reproduce the specific color does not develop the color.

Further features of the present invention will become apparent from the following description of exemplary embodiments with reference to the attached drawings.

BRIEF DESCRIPTION OF THE DRAWINGS

FIG. 26 is a view for explaining a correction table that stores the pixel values in the immediately preceding pixel region, which are corrected in accordance with the pixel values at the image start end if the immediately preceding pixel region includes white pixels;

FIG. 28 is a view showing preheating instructions according to the combination of specific colors of the immediately preceding pixel region IW and an image start end IA and the numbers of table groups to be used;

DESCRIPTION OF THE EMBODIMENTS

Figure 1:
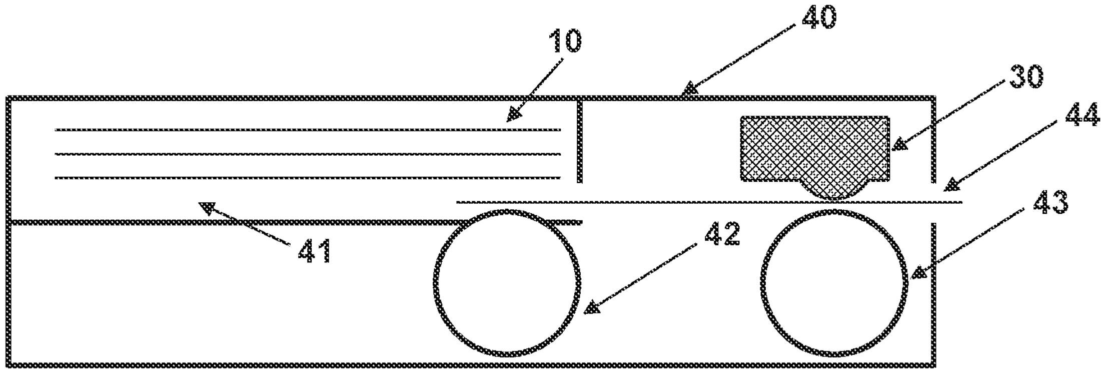
FIG. 1 is a side sectional view showing the schematic configuration of a printing apparatus according to a representative example of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

<Outline of Printing Apparatus (FIGS. 1 to 3)>

FIG. 1 is a side sectional view showing the schematic configuration of a printing apparatus according to a representative example of the present invention.

As shown in FIG. 1, a printing apparatus 40 includes a printhead 30, a storage unit 41, a conveyance roller 42, a platen 43, and a discharge port 44. A plurality of sheet-shaped print media 10 can be stored in the storage unit 41. The print media 10 can be replenished by opening/closing a cover (not shown). At the time of printing, the print medium 10 is conveyed to the lower side of the printhead 30 by the conveyance roller 42. After an image is formed between the platen 43 and the printhead 30, the print medium 10 is discharged from the discharge port 44, thereby completing printing.

Figure 2:
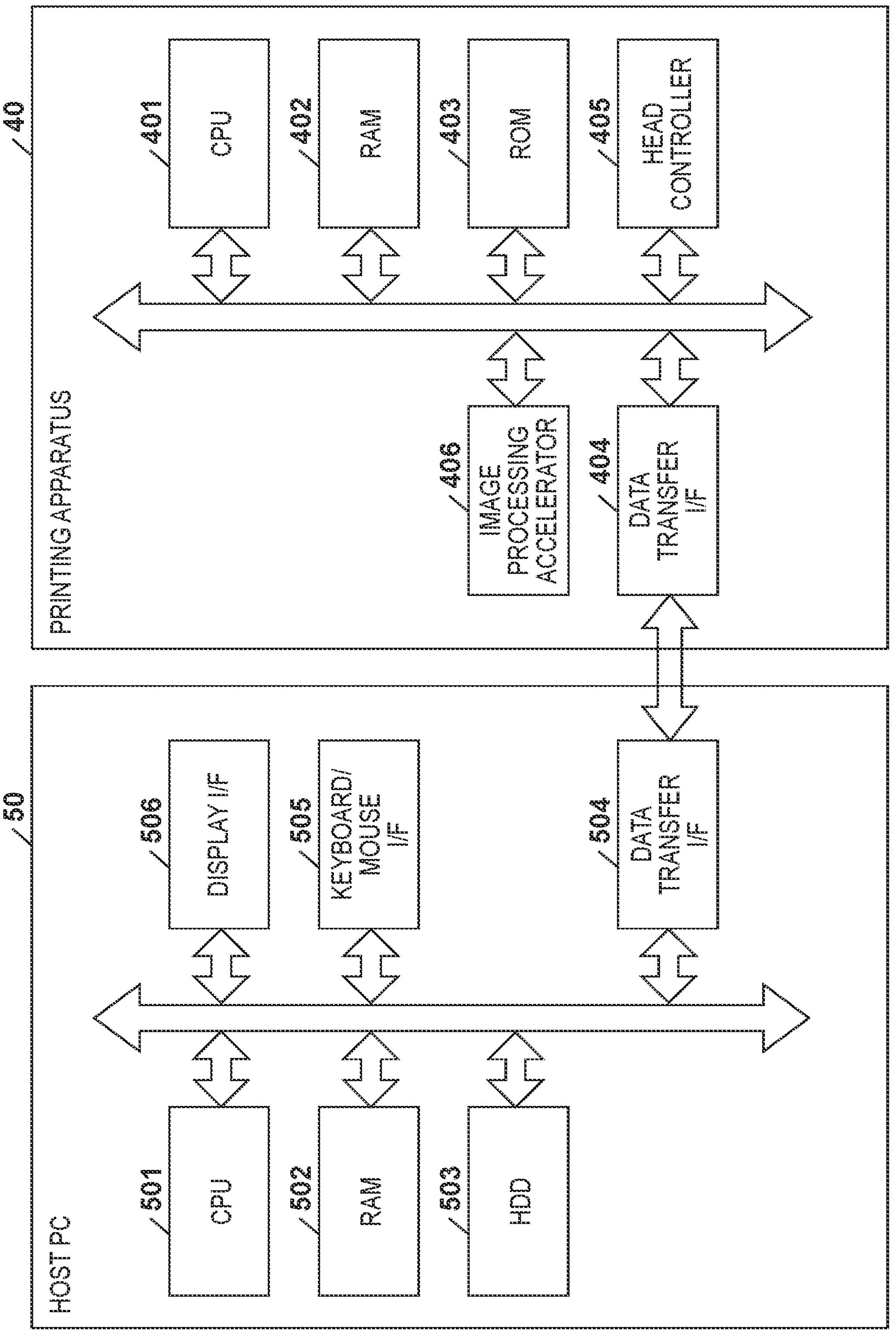
FIG. 2 is a block diagram showing the control configuration of the printing apparatus shown in FIG. 1 and a host apparatus connected to this.

FIG. 2 is a block diagram showing the control configuration of a printing system formed by the printing apparatus shown in FIG. 1 and a host apparatus connected to this. As shown in FIG. 2, the printing system is formed by the printing apparatus 40 shown in FIG. 1, and a personal computer (host PC) 50 serving as a host apparatus.

The host PC 50 includes a CPU 501, a RAM 502, an HDD 503, a data transfer interface (I/F) 504, a keyboard/mouse interface (I/F) 505, and a display interface (I/F) 506.

The CPU 501 executes processing according to a program held in the HDD 503 or the RAM 502. The RAM 502 is a volatile storage and temporarily holds programs and data. The HDD 503 is a nonvolatile storage and similarly holds programs and data. The data transfer I/F 504 controls data transmission/reception to/from the printing apparatus 40. As the data transmission/reception transfer method, wired connection such as USB, IEEE1394, or LAN or wireless connection such as Bluetooth® or WiFi can be used. The keyboard/Mouse® I/F 505 is an interface configured to control a UI (User Interface) such as a keyboard or a mouse, and a user can input information to the host PC via this. The display IN 506 controls display on a display (not shown).

On the other hand, the printing apparatus 40 includes a CPU 401, a RAM 402, a ROM 403, a data transfer interface (I/F) 404, a head controller 405, and an image processing accelerator 406.

The CPU 401 executes processing according to each embodiment to be described later in accordance with a program held in the ROM 403 or the RAM 402. The RAM 402 is a volatile storage and temporarily holds programs and data. The ROM 403 is a nonvolatile storage and holds table data and programs used in processing according to each embodiment to be described later. The data transfer IN 404 controls data transmission/reception to/from the PC 50.

The head controller 405 controls a heating operation (to be described later) of the printhead 30 based on print data. More specifically, the head controller 405 is configured to load control parameters and print data from a predetermined address of the RAM 402. That is, when the CPU 401 writes the control parameters and print data to the predetermined address of the RAM 402, processing is activated by the head controller 405, and the heating operation of the printhead is performed.

The image processing accelerator 406 is formed by hardware and executes image processing faster than the CPU 401. More specifically, the image processing accelerator 406 is configured to load parameters and data necessary for image processing from a predetermined address of the RAM 402. When the CPU 401 writes the parameters and data to the predetermined address of the RAM 402, the image processing accelerator 406 is activated, and predetermined image processing is performed.

Note that the image processing accelerator 406 is not always a necessary constituent element, and the above-described table parameter creation processing and image processing may be executed only by the processing of the CPU 401 in accordance with the specifications of the printing apparatus.

<Outline of Configuration of Printhead (FIG. 3)>

Figure 3:
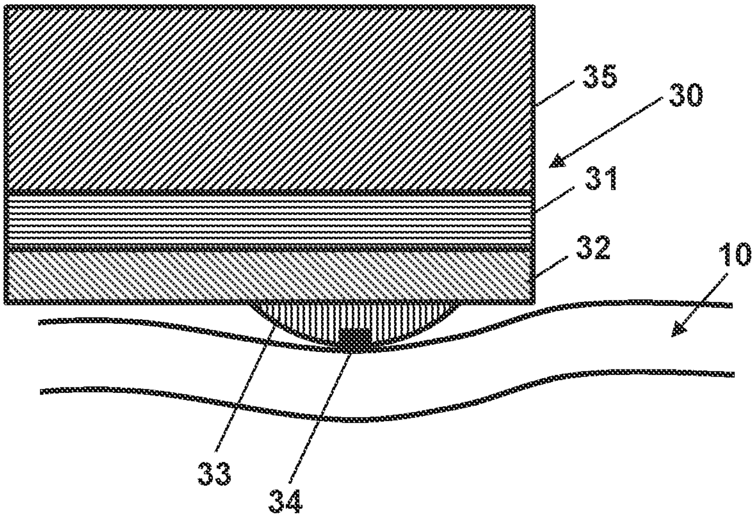
FIG. 3 is a side sectional view showing the detailed configuration of a printhead mounted in the printing apparatus shown in FIG. 1.

FIG. 3 is a side sectional view showing the configuration of the printhead and the state of the contact region between the printhead and a print medium.

The printhead 30 includes a glaze 32 on a substrate 31. The glaze 32 may further include a "convex glaze" 33. If the convex glaze 33 exists, a resistor 34 is arranged on the surface of the convex glaze 33. If the convex glaze 33 does not exist, the resistor 34 is arranged on the surface of the flat glaze 32. Note that a protective film layer is preferably formed on the resistor 34, the glaze 32, and the convex glaze 33. In general, the combination of the glaze 32 and the convex glaze 33, which are made of the same material, will be referred to as "the glaze of the printhead" hereinafter.

The substrate 31 is in contact with a heat sink 35 and is cooled using a fan or the like. The print medium 10 contacts the glaze of the printhead whose length is substantially more than the length of an actual heating resistor in general. The resistor 34 is an electrothermal transducer (a heater or a heating element) that generates heat upon receiving a current. A typical resistor has a length of about 120 m in the conveyance direction of the print medium 10. However, the thermal contact region between the print medium and the glaze of a general printhead has a length of 200 m or more.

<Outline of Print Principle (FIGS. 4 and 5)>

Figure 4:
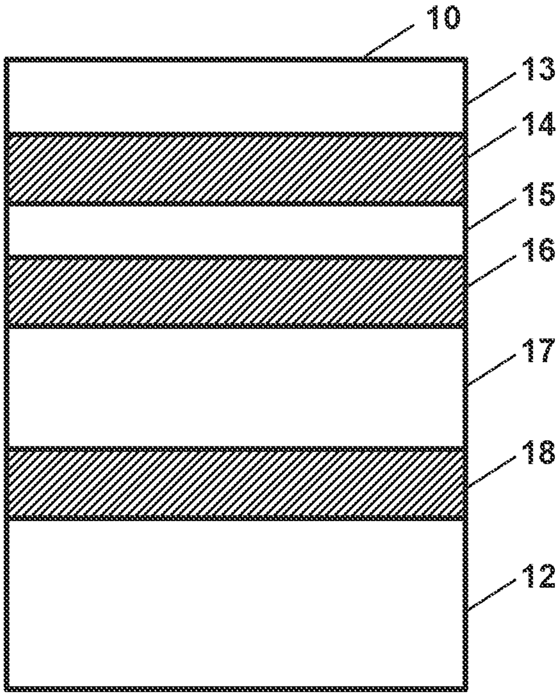
FIG. 4 is a side sectional view showing the detailed structure of an ink ribbon heated by the printhead shown in FIG. 3.

FIG. 4 is a sectional view showing the structure of a sheet-shaped print medium to be used for image processing using infrared rays as a heat source. In the print medium 10, as will be described below in detail, color development layers of a plurality of colors, which develop the colors when heated by heat rays (infrared rays) radiated from the resistor 34 upon receiving a supplied current, are stacked. Since a full color image is formed when the color development layers develop the colors, the print medium 10 is also called an infrared image member. Hence, in that sense, the print medium 10 will be referred to as an infrared image member in the following explanation.

As shown in FIG. 4, in the infrared image member 10, image forming layers 14, 16, and 18, spacer layers 15 and 17, and a protective film layer 13 are formed on a base material 12 that reflects light. The image forming layers 14, 16, and 18 are generally yellow (Y), magenta (M), and cyan (C), respectively, in full color printing. However, a combination of other colors may be used.

The image forming layers are colorless in the initial state. When heated to a specific temperature called an activation temperature, each layer changes to a colored state. The order of the colors of the image forming layers can arbitrarily be selected. One suitable color order has been described above. As another suitable order, the three image forming layers 14, 16, and 18 are cyan (C), magenta (M), and yellow (Y), respectively. An example in which the layers are configured in the above-described order of yellow (Y), magenta (M), and cyan (C) will be described here.

The spacer layer 15 is preferably thinner than the spacer layer 17. However, this does not apply to a case in which materials including both layers substantially have the same thermal diffusivity. The function of the spacer layer is to control thermal diffusion in the infrared image member 10. Suitably, if the spacer layer 17 is formed by the same member as the spacer layer 15, the spacer layer 17 is preferably thicker at least four times. All layers arranged on the base material 12 are substantially transparent before image formation. If the base material 12 has a reflecting color (for example, white), a color image formed in the infrared image member 10 is visually recognized through the protective film layer 13 against the reflecting background provided by the base material 12. Since the layers arranged on the base material 12 are transparent, the combination of colors formed in the image forming layers can be seen.

Note that the three image forming layers 14, 16, and 18 of the infrared image member 10 are arranged on the same side of the base material 12. However, some image forming layers may be arranged on the opposite side of the base material 12.

The image forming layers 14, 16, and 18 are at least partially independently processed by changing two adjustable parameters, that is, the temperature and time. These parameters are adjustable, and an image is formed in a desired image forming layer by selecting the printhead temperature and the time period during heating of the infrared image member.

Here, each of the image forming layers 14, 16, and 18 is processed when heated while the printhead 30 contacts the uppermost layer of the member, that is, the protective film layer 13 of the infrared image member 10. An activation temperature (Ta3) of the image forming layer 14 (the third layer counted from the base material 12, or the image forming layer closest to the surface of the infrared image member 10) is higher than an activation temperature (Ta2) of the image forming layer 16, and is similarly higher than an activation temperature (Ta1) 18 of the image forming layer 18.

Heating of image forming layers at farther distances from the printhead 30 is delayed by time necessary for heating to diffuse heat to those layers via the spacer layers. Because of this heating delay, for the image forming layers of lower activation temperatures (the layers farther from the printhead), the image forming layer closer to the printhead never activates the image forming layers on the lower side even its activation temperature is substantially higher. The image forming layer can be heated to a temperature higher than those activation temperatures. Hence, when processing the image forming layer 14 of the uppermost layer, the printhead 30 is heated to a relatively high temperature in a short time. This heating is insufficient for both the image forming layers 16 and 18, and these layers are not activated.

To activate only an image forming layer closer to the base material 12 (in this case, the image forming layer 16 or 18), the image forming layer is heated for a sufficiently long time at a temperature lower than the activation temperature of the image forming layer farther from the base material 12. If the image forming layer of the lower activation temperature is this activated, the image forming layer of the higher activation temperature is not activated.

Heating of the infrared image member 10 is preferably performed using the printhead 30. However, some method of giving controlled heat to the infrared image member may be used. For example, some known means such as using a modulated light source (for example, a laser light source) may be used.

Figure 5:
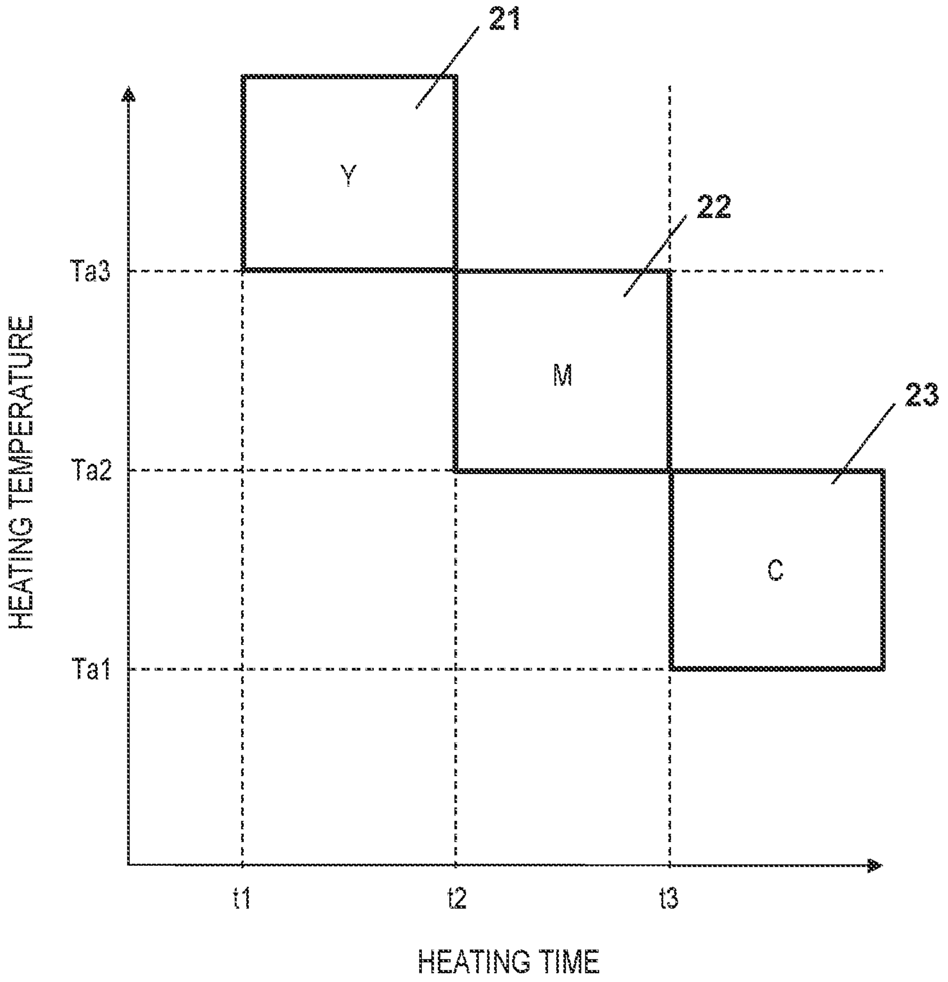
FIG. 5 is a view for explaining a print principle by the printhead shown in FIG. 3.

FIG. 5 is a view for explaining the printhead heating temperature and time necessary for processing the three image forming layers shown in FIG. 4.

Referring to FIG. 5, the ordinate represents the heating temperature on the surface of the infrared image member 10 that contacts the printhead 30, and the abscissa represents the heating time. A region 21 (the printhead is heated to a relatively high temperature for a relatively short heating time) provides image formation of the image forming layer 14, and a region 22 (the printhead is heated to an intermediate temperature for an intermediate heating time) provides image formation of the image forming layer 16. Also, a region 23 (the printhead is heated to a relatively low temperature for a relatively long heating time) provides image formation of the image forming layer 18. The time necessary for image formation of the image forming layer 18 is substantially longer than the time necessary for image formation of the image forming layer 14.

The activation temperature selected for an image forming layer generally falls within the range of about 90° C. to about 300° C. The activation temperature (Ta1) of the image forming layer 18 is preferably low as consistently as possible, during shipment and storage, for the thermal stability of the infrared image member, and is suitably, for example, about 100° C. or more. The activation temperature (Ta3) of the image forming layer 14 is preferably consistently low such that the image forming layer 14 is not activated by the heating method of this embodiment, and the image forming layers 16 and 18 are activated by heating through this layer, and is suitably, for example, about 200° C. or more. The activation temperature (Ta2) of the image forming layer 16 suitably ranges from about 140° C. to about 180° C. and satisfies Ta1<Ta2<Ta3.

The printhead 30 used here includes a resistor array in which a plurality of resistors are linearly arranged to extend substantially throughout the whole width of an image (a direction orthogonal to the conveyance direction of the infrared image member).

Note that the print width of the printhead may be shorter than the width of an image. In this case, the printhead is configured to move with respect to the infrared image member 10 to process the whole width of the image, or is used together with another printhead.

When a current is supplied to the resistors, heating pulses are provided. On the other hand, image formation is performed when the infrared image member is being conveyed in the direction orthogonal to the array direction of the resistors of the printhead. The time of heating the infrared image member 10 by the printhead 30 typically falls within the range of about 0.001 to about 100 msec for each line of the image. The upper limit is reasonably set in consideration of an image print time, and the lower limit is defined by the restrictions of an electronic circuit. The dot interval of a formed image generally falls within the range of 100 to 600 lines per inch in both the vertical direction and the conveyance direction of the infrared image member 10. The interval may be different in each direction.

The above-described printing apparatus is a kind of thermal printer. The printing method employed by the apparatus is a ZINK (Zero Ink) method, which is also called a Zero Ink Technology®.

Example 1

Here, to emphasize the effect of Example 1, a conventional printing method will be described first as a comparative example, and the example will be described after that.

Figure 6:
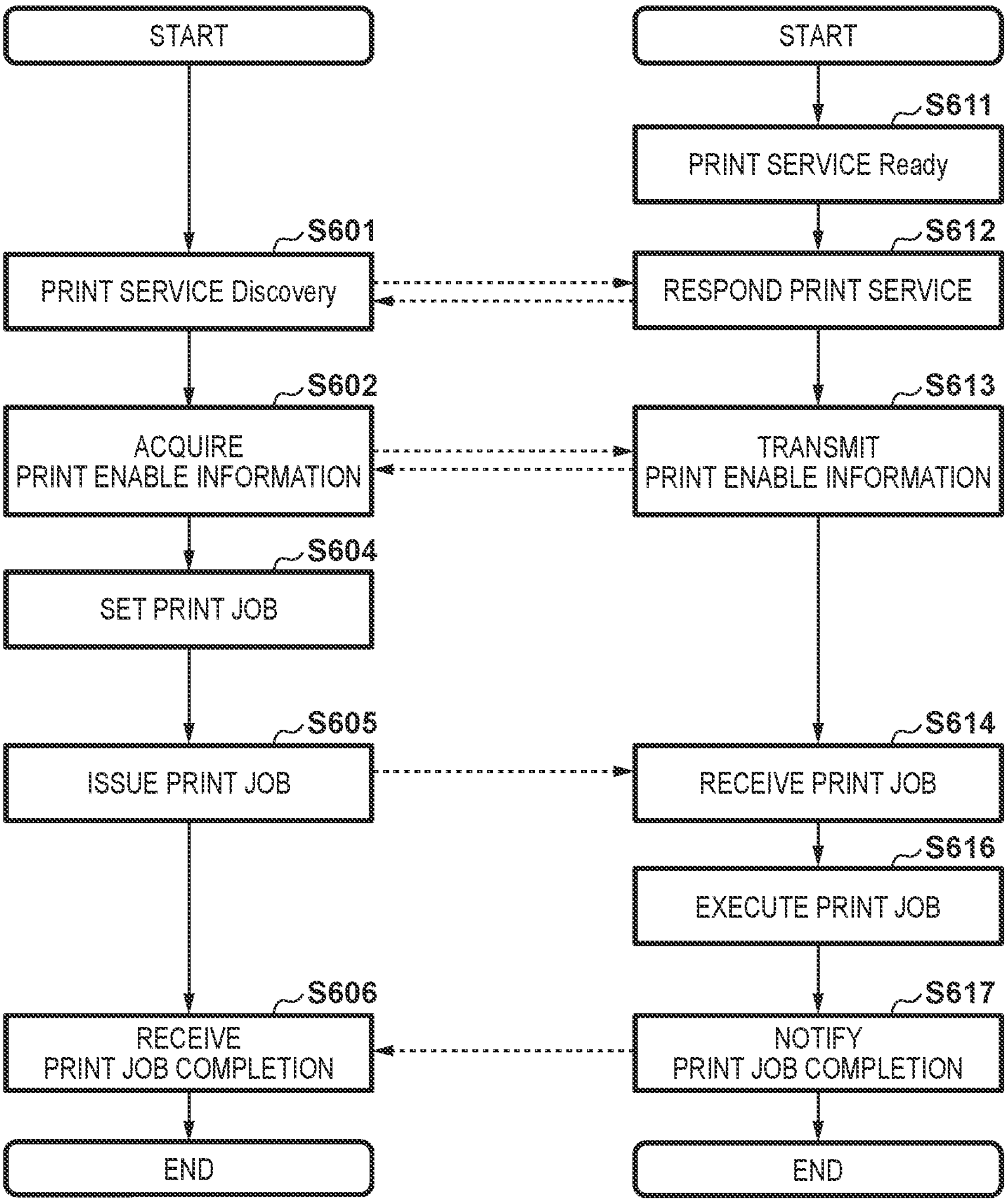
FIG. 6 is a flowchart showing conventional print processing as a comparative example.
Figure 7:
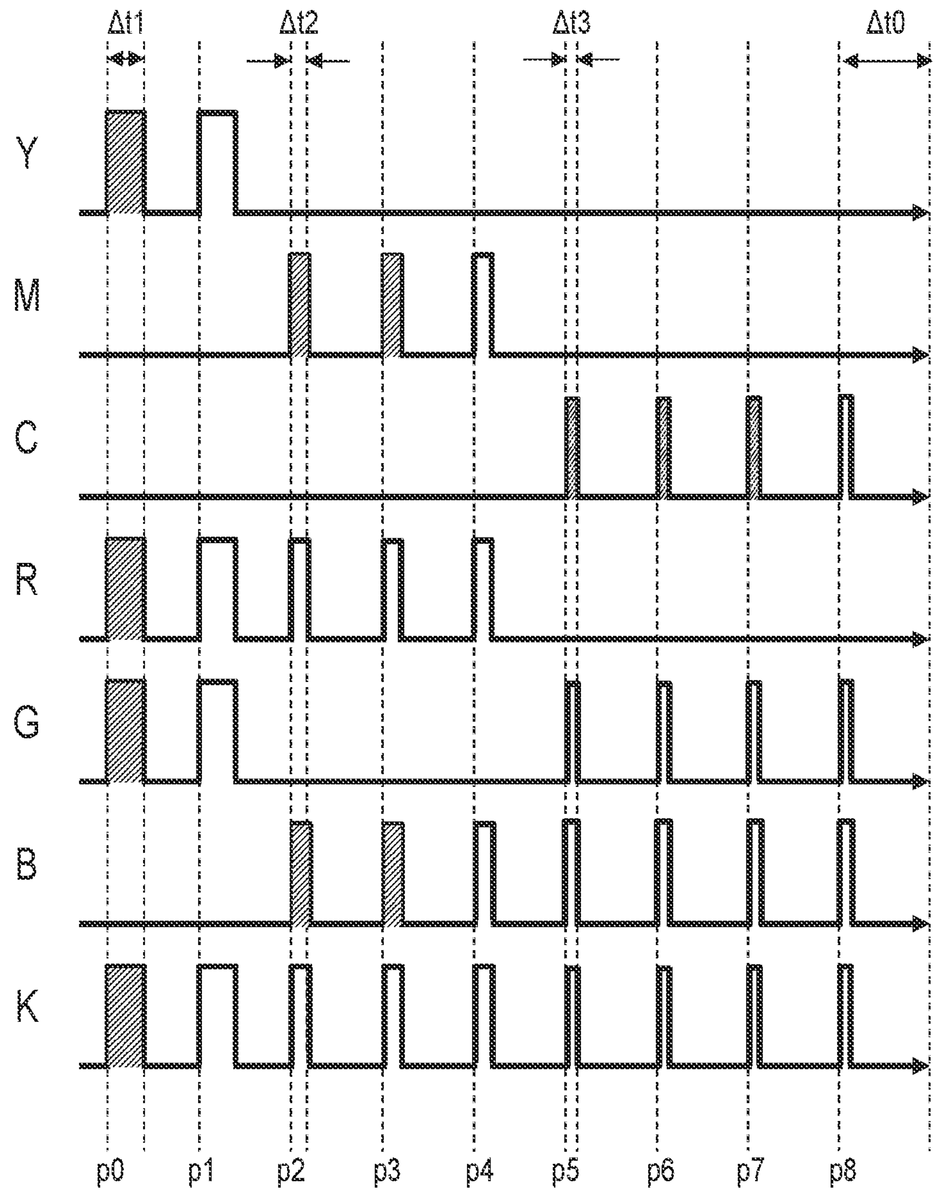
FIG. 7 is a view for explaining control of a printhead of a conventional example as a comparative example.

Description of Comparative Example (FIGS. 6 and 7)

FIG. 6 is a flowchart showing the processing of the printing apparatus 40 and the host PC 50 when a conventional print service is executed in the above-described printing system. Referring to FIG. 6, steps S601, S602, and S604 to S606 represent the processing of the host PC 50, and steps S611 to S614, S616, and S617 represent the processing of the printing apparatus 40. Also, as shown in FIG. 6, if the user demands printing, the processing of the host PC 50 starts, and accordingly, the processing of the printing apparatus 40 starts. Hence, the printing apparatus 40 confirms, in step S611, that it can perform printing, starts the print service, and is set in a print preparation completion state (Ready).

In this state, when the host PC 50 executes print service Discovery in step S601, in step S612, the printing apparatus 40 responds to the Discovery, and notifies the host PC that the printing apparatus is an apparatus capable of providing the print service. Next, in step S602, the host PC 50 acquires print enable information. Basically, the host PC 50 requests print enable information from the printing apparatus 40. In step S614, in response to the request, the printing apparatus 40 notifies the host PC of the information of the print service that the apparatus can provide.

Furthermore, in step S604, the host PC 50 constructs a user interface for print job creation based on the notified print enable information. More specifically, based on the print enable information of the printing apparatus 40, appropriate choices such as print sizes and printable paper sizes are displayed on the display and provided to the user. Next, in step S605, the host PC 50 issues a print job.

In response to this, the printing apparatus 40 receives the print job in step S614, and executes the print job in step S616. When printing based on the print job in the printing apparatus 40 is completed, in step S617, the printing apparatus 40 notifies the host PC 50 of the printing completion. In step S606, the host PC 50 receives the printing completion notification and notifies the user of it.

When the print job is completed, each of the host PC 50 and the printing apparatus 40 completes the series of print service processes.

In the above description, various kinds of information transmission have been described using an example in which the host PC 50 sends a request to the printing apparatus 40, and the printing apparatus 40 responds to the request. However, communication between the host PC and the printing apparatus is not limited to a so-called pull type, and a so-called push type in which the printing apparatus 40 spontaneously transmits information to the host PC 50 (and other host PCs) existing in the network may be used.

FIG. 7 is a view showing an example of heating pulses applied to the printhead of the printing apparatus. In FIG. 7, a timing p0 is the earliest timing, and the time becomes late from the left side to the right side on the time base.

Colors to be developed are shown on the left side of FIG. 7, and corresponding heating pulses are shown on the right side. For example, when developing yellow (Y), to implement the heating temperature and the heating time in the region 21 shown in FIG. 5, heating in time Δt1 is executed twice in total at an interval Δt0. Also, when developing magenta (M), to implement the heating temperature and the heating time in the region 22 shown in FIG. 5, heating in time Δt2 is executed three times in total at the interval Δt0. Similarly, when developing cyan (C), to implement the heating temperature and the heating time in the region 23 shown in FIG. 5, heating in time Δt3 is executed four times in total at the interval Δt0.

Note that in FIG. 7, to facilitate understanding, it is assumed that a relationship given by Δt1×2=Δt2×3=Δt3×4 holds. The total time of heating pulses applied to the printhead 30 is constant independently of the color to be developed.

However, the heating times hold $$t2>\Delta t1+\Delta t0>t1,$$

$$t3>\Delta t2+\Delta t0\times 2>t2,\text{ and}$$

$$\Delta t3+\Delta t0\times 3>t3,$$

and the relative relationship between the heating times of the image forming layers is given by heating time of $Y$<heating time of $M$<heating time of $C$ where Y, M, and C indicate the image forming layers 14, 16, and 18, respectively.

Here, as for the heat amount applied by the printhead 30, during the pulse interval Δt0, heat is conducted to the glaze 32, the substrate 31, and the heat sink 35 of the printhead 30, and therefore, the temperature of the infrared image member 10 lowers. Similarly, since the amount of heat conducted to the infrared image member 10 is also conducted to the platen 43 and the like, the temperature of the infrared image member 10 lowers accordingly. As a result, since the supplied energy is the same, the relative relationship between the peak temperatures of the image forming layers in heating is given by peak temperature of $Y$>peak temperature of $M$>peak temperature of $C$ Here, when control is performed such that peak temperature of $Y>Ta3$, $Ta3$>peak temperature of $M>Ta2$, and $Ta2$>peak temperature of $C>Ta1$ hold, the colors (primary colors) of Y, M, and C can independently be developed.

Heating pulses for controlling color development of R, G, and B, which are secondary colors, and K which is a tertiary color will be described next. Here, the secondary color is a color reproduced using two of the primary colors (that is, Y, M, and C), and the tertiary color is a color reproduced using all primary colors.

For red (R) shown in FIG. 7, the heating pulses are controlled such that the colors are developed in the order of yellow (Y)→magenta (M). Also, for green (G) shown in FIG. 7, the heating pulses are controlled such that the colors are developed in the order of yellow (Y)→cyan (C). Similarly, for blue (B) shown in FIG. 7, the heating pulses are controlled such that the colors are developed in the order of magenta (M)→cyan (C). Finally, for black (K) shown in FIG. 7, the heating pulses are controlled such that the colors are developed in the order of yellow (Y)→magenta (M)→cyan (C).

In this comparative example, when developing each of single yellow (Y), magenta (M), and cyan (C) colors, only the final heating pulse contributes color development, and pulses before that play the role of preheating. In FIG. 7, in the pulses, pulses (preheating pulses) mainly used for preheating are hatched, and pulses (image formation pulses: main pulses) mainly used for color development are indicated by lines. Concerning the colors, the application timings of the heating pulse are as follows. That is,

| Colors | Preheating pulse application timings | Image formation pulse application timings |
|---|---|---|
| Y | p0 | p1 |
| M | p2, p3 | p4 |
| C | p5, p6, p7 | p8 |
| R | p0 | p1, p2, p3, p4 |
| G | p0 | p1, p5, p6, p7, p8 |
| B | p2, p3 | p4, p5, p6, p7, p8 |

-continued

| Colors | Preheating pulse application timings | Image formation pulse application timings |
|---|---|---|
| K | p0 | p1, p2, p3, p4, p5, p6, p7, p8 |

As described above, drive pulses usable for actual image formation are short. In particular, pulses used for image formation of M in single M, C, and B colors are very short. This is because when developing colors other than that, heating for first Y color development has the preheating effect for other colors.

Hence, according to the above-described comparative example, concerning magenta (M) in the colors without color development of yellow (Y), that is, magenta (M), cyan (C), and blue (B), most drive pulses used for color development of each color are used for preheating, and the color development time is short. As a result, an image with a narrow color development region and having low color development properties on the infrared image member 10 is formed.

Hence, in Example 1, the following print control processing is executed for the above-described comparative example.

Description of Example (FIGS. 8 to 12)

Figure 8:
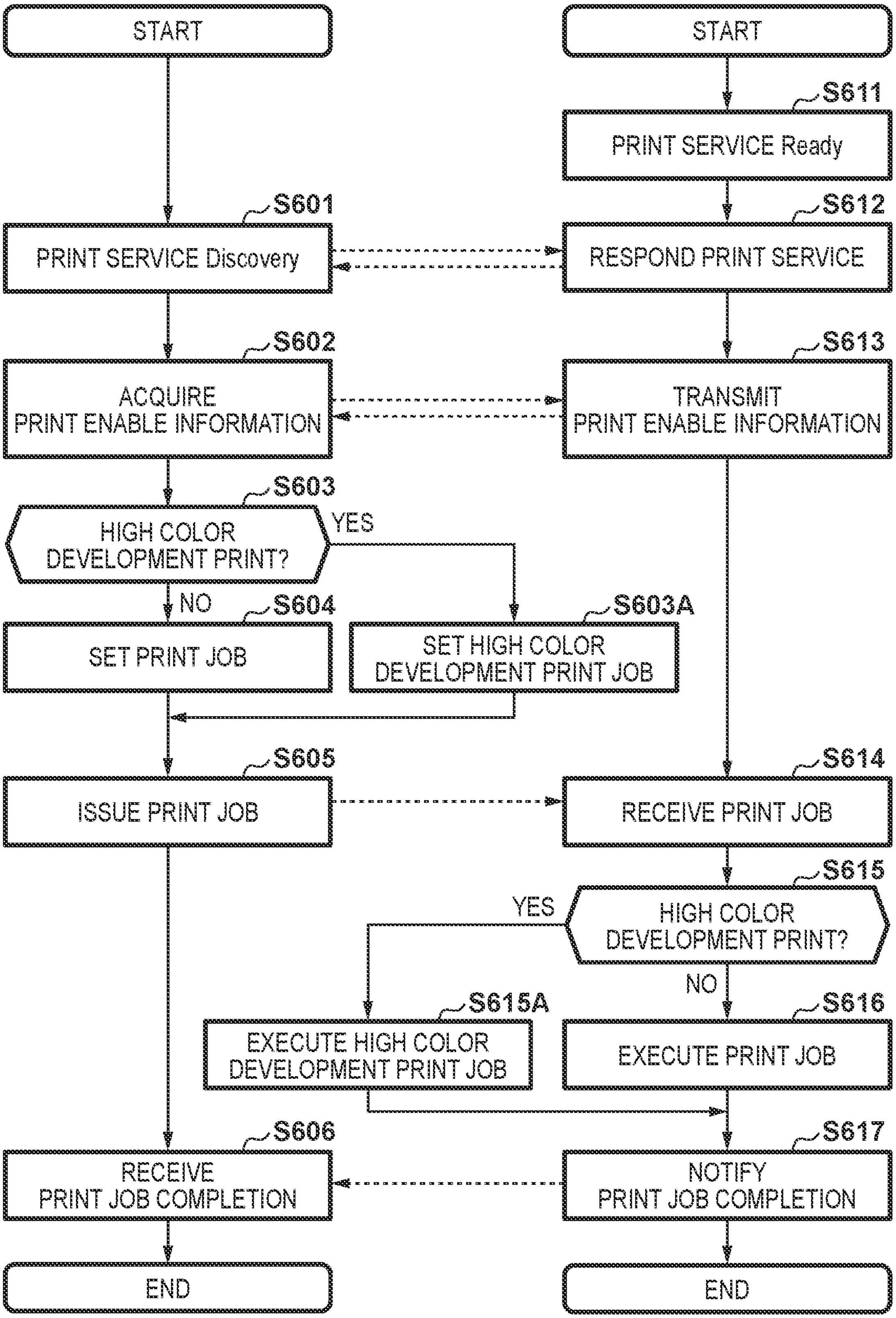
FIG. 8 is a flowchart showing processing of a printing apparatus and a host PC when a print service according to Example 1 is executed in a printing system.

FIG. 8 is a flowchart showing processing of the printing apparatus 40 and the host PC 50 when a print service according to Example 1 is executed in the above-described printing system. Note that in FIG. 8, for the same processing steps as already described with reference to FIG. 6, the same step numbers are added, and a description thereof will be omitted.

In step S611 in FIG. 8, the printing apparatus 40 confirms that it can perform printing and cope with high color development printing, and starts the print service. Also, in response to the print service Discovery of the host PC 50 in step S601, in step S612, the printing apparatus 40 notifies the host PC that the printing apparatus is an apparatus capable of providing a print service including a high color development print service. Hence, in step S613 as well, the printing apparatus 40 notifies the host PC of print enable information including the information of the high color development print service.

In response to this, the host PC 50 displays, on the display or the like, information for selecting which one of the normal print service and the high color development print service is to be used, more specifically, display and choices of "print service" and "high color development print service" and notifies the user of this. That is, in step S603, the process checks whether an instruction from the user is "print service" or "high color development print service".

Here, if the selection result by the user is "print service", the process advances to step S605 to execute the same processing as described with reference to FIG. 6. If the selection result is "high color development print service", the process advances to step S603A. In step S603A, the host PC 50 constructs a user interface for high color development print job creation based on the print enable information. More specifically, based on the print enable information from the printing apparatus 40, a print size, a printable paper size, and the like are displayed on the screen. Furthermore, the user is caused to input a selection instruction according to the display. In addition to this, a preview image of high color development is displayed, and the user is caused to select a high color development method, thereby creating a high color development print job. Details of high color development print job creation will be described later with reference to FIGS. 10 and 11. After creation of the high color development print job, the process advances to step S605.

On the other hand, in step S615, the printing apparatus 40 checks whether the received print job is a normal print job or a high color development print job. Here, if the received print job is a high color development print job, the process advances to step S615A to execute the high color development print job in a high color development print mode, and then advances to step S617. On the other hand, if the received print job is a normal print job, the same processing as described with reference to FIG. 6 is executed.

Figure 9:
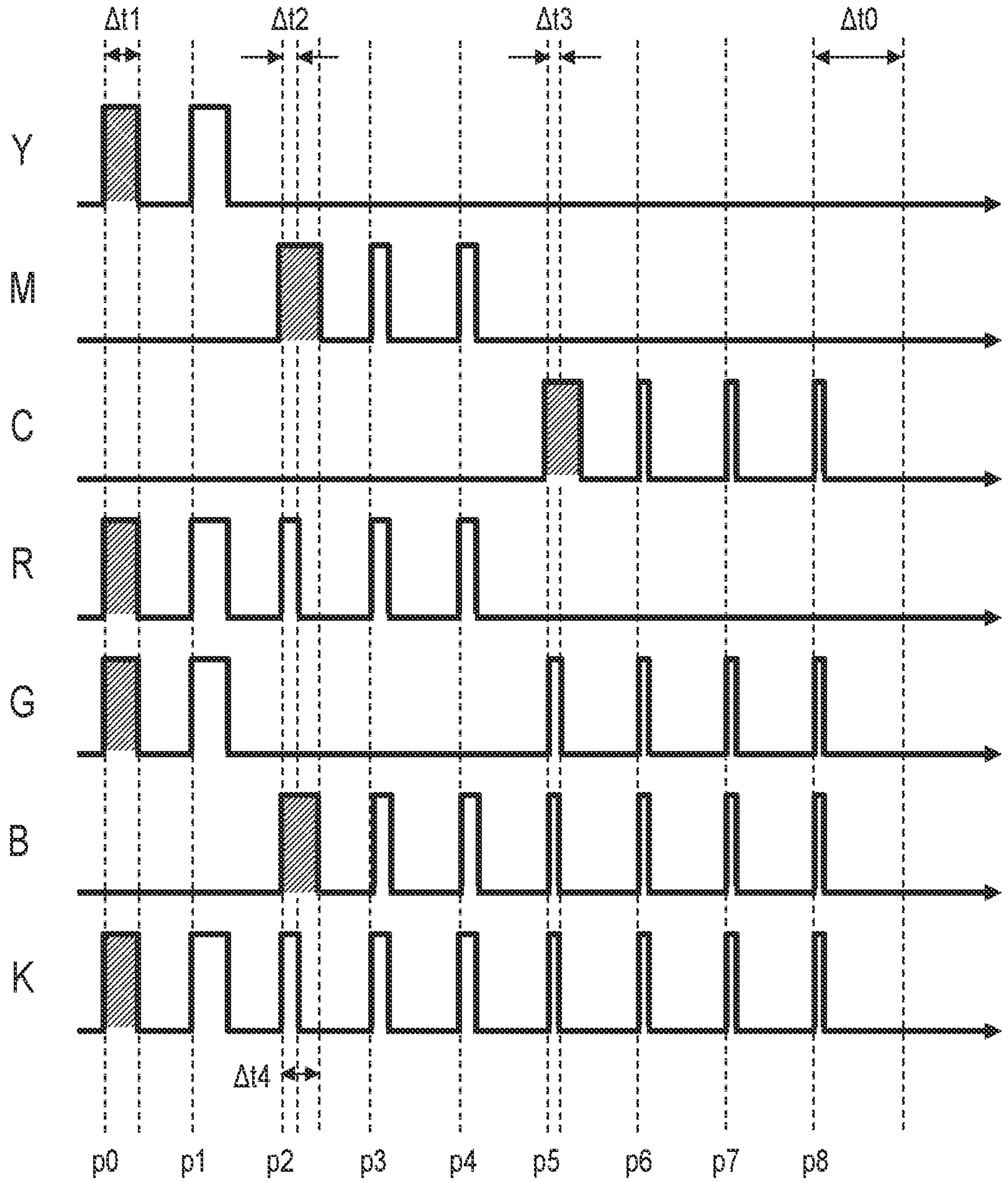
FIG. 9 is a view showing an example of heating pulses applied to the printhead of the printing apparatus according to the processing of Example 1.

FIG. 9 is a view showing an example of heating pulses applied to the printhead of the printing apparatus according to the processing of Example 1. Note that in FIG. 9, a description of the same components and symbols as described with reference to FIG. 7 will be omitted, and only components unique to Example 1 will be described here.

As shown in FIG. 9, here, the pulse width of the first pulse in a drive pulse group for color development of each color is made long, thereby using the pulse as a preheating pulse. In FIG. 9, preheating pulses for high color development are indicated by dark hatching, and include the following three pulses. That is, these are a pulse having a pulse width Δt4 and applied at timing p2 for M color development a pulse having the pulse width Δt4 and applied at timing p5 for C color development, and a pulse having the pulse width Δt4 and applied at timing p2 for B color development.

Here, the preheating time Δt4 satisfies $$\Delta t4 < \text{heating time } \Delta t1 \text{ of } Y + \Delta t0, \text{ and } \Delta t4 \approx \Delta t1$$

The relative relationship of heating times remains $$\text{heating time of } Y < \text{heating time of } M < \text{heating time of } C$$

which is the same as in the comparative example shown in FIG. 7.

As described above, the pulse width Δt4 of the preheating pulse for high color development is set such that Y and C do not develop colors by the heating pulse for preheating for M color development, and Y and M do not develop colors by the heating pulse for preheating for C color development.

Here, as for the heat amount applied by the printhead 30, during the interval time Δt0, heat is conducted to the glaze 32, the substrate 31, and the heat sink 35 of the printhead 30, and therefore, the temperature of the infrared image member 10 lowers. Similarly, since the amount of heat conducted to the infrared image member 10 is also conducted to the platen 43 and the like, the temperature of the infrared image member 10 lowers accordingly. As a result, although energies supplied or color development of M and C increase by Δt4−Δt2, and Δt4−Δt3, respectively, the relationship of peak temperatures by heating remains peak temperature of Y>peak temperature of M>peak temperature of C which is the same as in the comparative example shown in FIG. 7.

In this point as well, the pulse width Δt4 of the preheating pulse for high color development is set such that Y and C do not develop colors by the heating pulse for preheating for M color development, and Y and M do not develop colors by the heating pulse for preheating for C color development.

When the heating pulse for preheating exists, the color development time of M at the time of single M color development becomes close to that at the time of R and K color development, the color development time of C at the time of single C color development of becomes close to that at the time of G, B, and K color development, and the color development time of M in the B color becomes close to that at the time of R and K color development.

With this control, the color development time becomes long, the color development region on the infrared image member 10 becomes wide, and an image of high color development properties is formed. More specifically, details of the application timings of the preheating pulses that form the heating pulses of the colors and the image formation pulses are as follows. That is,

| Colors | Preheating pulse application timing | Image formation pulse application timing |
|---|---|---|
| Y | p0 | p1 |
| M | p2 | p3, p4 |
| C | p5 | p6, p7, p8 |
| R | p0 | p1, p2, p3, p4 |
| G | p0 | p1, p5, p6, p7, p8 |
| B | p2 | p3, p4, p5, p6, p7, p8 |
| K | p0 | p1, p2, p3, p4, p5, p6, p7, p8 |

As described above, pulses usable for usable for actual image formation are long.

Figure 10:
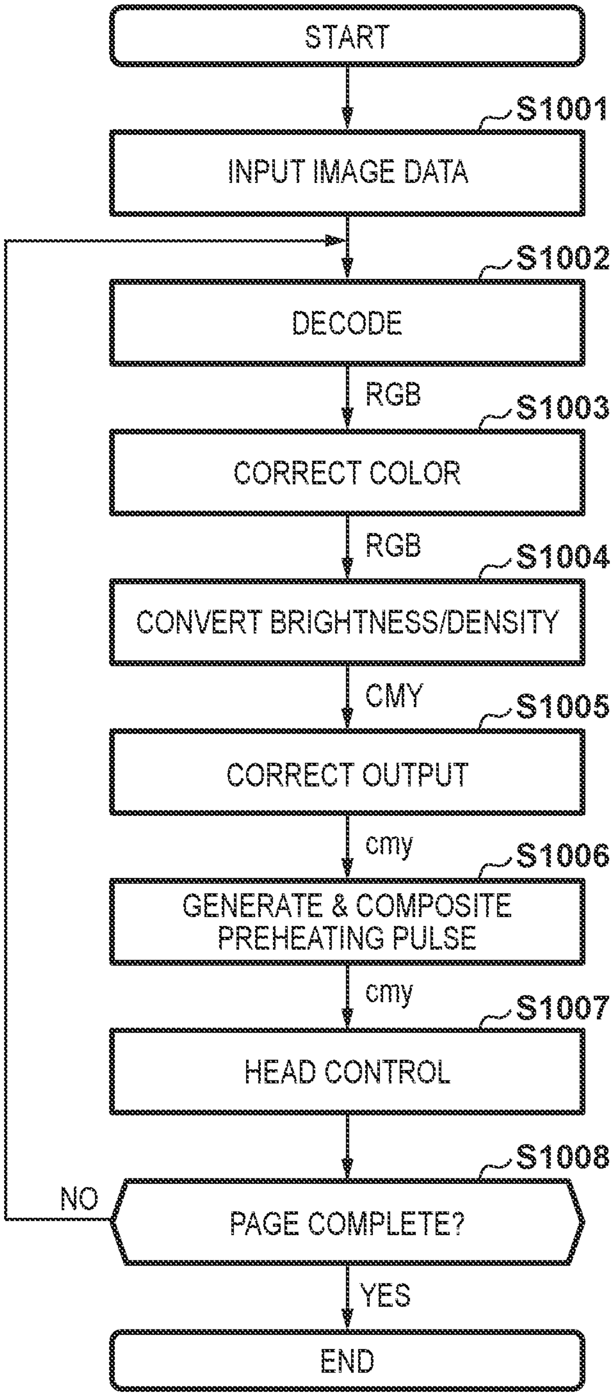
FIG. 10 is a flowchart showing image processing of generating heating pulses and driving the printhead according to Example 1.

FIG. 10 is a flowchart showing image processing of generating heating pulses and driving the printhead according to Example 1. This is a flowchart showing details of high color development print job execution in step S615A of FIG. 8.

According to FIG. 10, in step S1001, image data in the high color development print job received in step S814 is input. Next, in step S1002, decoding processing is executed if the image data is compressed or encoded. Furthermore, in step S1003, color correction processing is executed. This can also be executed on the side of the host PC 50. However, when performing color correction according to the characteristic of the printing apparatus 40, it is preferably performed by the printing apparatus 40. At this point of time as well, image data has the general RGB data format. At this point of time, however, the image data is generally RGB data reflecting the characteristic of the printing apparatus 40, that is, so-called device RGB.

Next, in step S1004, brightness/density conversion is executed. In a general thermal printer, when each color component of each pixel is expressed 8 bits, conversion is performed by $$C=255-R$$

$$M=255-G$$

$$Y=255-B$$

Here, in preheating pulse control according to this example, for example, a preheating parameter when developing a single magenta (M) color and a preheating parameter when developing red (R) are different. Hence, to individually set these, brightness/density conversion using a three-dimensional lookup table (3D_LUT) is preferably executed. That is, conversion is performed by $C=3D\_LUT[R][G][B][0]$ $M=3D\_LUT[R][G][B][1]$ $Y=3D\_LUT[R][G][B][2]$ $PM=3D\_LUT[R][G][B][3]$ $PC=3D\_LUT[R][G][B][4]$ Here, PM and PC represent density values corresponding to the preheating pulses when developing M and C.

Here, the above-described 3D_LUT is formed by 256×256×256×5=83,886,080 data tables. Each data is data having the width of a pulse applied at each of the timings p0 to p8 in FIG. 7. However, to decrease the data amount, the number of grids may be decreased from 256 to 17. Using 17×17×17×5=24,565 data tables, a result may be calculated using an interpolation operation together. Not 17 grids but another suitable number of grids such as 16 grids, 9 grids, or 8 grids may appropriately be set, as a matter of course. As the interpolation method, any method such as known tetrahedral interpolation can be used.

Hence, a control pulse for forming yellow (Y) and a preheating parameter, a control pulse for forming magenta (M) and a preheating parameter, a control pulse for forming cyan (C) and a preheating parameter, magenta and yellow control parameters for forming red (R) and a preheating parameter, yellow and cyan control parameters for forming green (G) and a preheating parameter, magenta and cyan control parameters for forming blue (B) and a preheating parameter, and yellow, magenta, and cyan control parameters for forming black (K) and a preheating parameter can independently be set.

Furthermore, in step S1005, output correction is executed. First, pulse widths (c, m, y, pm, pc) for implementing color development of the density components C, M, and Y and preheating (pm, pc) for color development of magenta and cyan are calculated using a one-dimensional lookup table (1D_LUT). That is, $c=1D\_LUT[C]$ $m=1D\_LUT[M]$ $y=1D\_LUT[Y]$ $pm=1D\_LUT[PM]$ $pc=1D\_LUT[PC]$ are calculated. Here, the maximum value of c is Δt3, the maximum value of m is Δt2, the maximum value of y is Δt1, and the maximum values of pm and pc are Δt4. The printing apparatus 40 can modulate the color development strength on the infrared image member 10 by pulse width modulation (PWM). For this reason, if c, m, y, pm, and pc described above are smaller than the maximum values, the pulse widths can appropriately be made short, thereby implementing a desired tone. This processing may be done using a known means.

To implement the pulse control processing shown in FIG. 9, for example, in the single M color (R=255, G=0, B=255), $C=3D\_LUT[255][0][255][0]=0$ $M=3D\_LUT[255][0][255][1]=\Delta t2$ $Y=3D\_LUT[255][0][255][2]=0$ $PM=3D\_LUT[255][0][255][3]=\Delta t4$ $PC=3D\_LUT[255][0][255][4]=0$ need to be set.

Similarly, in the single C color (R=0, G=255, B=255), $C=3D\_LUT[0][255][255][0]=\Delta t3$ $M=3D\_LUT[0][255][255][1]=0$ $Y=3D\_LUT[0][255][255][2]=0$ $PM=3D\_LUT[0][255][255][3]=\Delta t4$ $PC=3D\_LUT[0][255][255][4]=0$ need to be set.

Also, here, the heating pulse by the printhead 30 is modulated depending on the temperature of the infrared image member 10 acquired by a temperature sensor (not shown) or the like. More specifically, control is performed such that the higher the acquired temperature is, the shorter the pulse width necessary for reaching the activation temperature is. This processing may be done using a known means. In addition, instead of directly detecting the temperature of the infrared image member 10 using a temperature sensor (not shown) or the like, the CPU 501 may execute temperature estimation for the infrared image member 10 and perform control based on the estimated temperature. As the temperature estimation method, any known method can be used.

Furthermore, in step S1006, a preheating pulse for high color development is generated and composited. Here, a preheating pulse strength for high color development is expressed as pre.

Next, the pulse widths for forming an image and the preheating pulse are composited. That is, the pulse widths at the timings p0 to p8 are set to p0=y, p1=y, p2=max(m, pm), p3=m, p4=m, p5=max(c, pc), p6=c, p7=c, and p8=c, and the pulses are composited. Here, max(x, y) is a function for setting the larger one of x and y. To implement the pulses generated by an electric circuit in a superimposed manner, p2=m or pm p5=c or pc are set. Here, x or y represents the OR of a signal x and a signal y.

Next, in step S1007, head control is executed. That is, the pulse widths at the timings p0 to p8 are controlled, thereby forming desired color development and high color development processing on the infrared image member 10.

Next, in step S1008, it is checked whether printing of the page is completed. If the result is NO, the process returns to step S1002 to print the continuation of the page. If the result is YES, print processing is ended.

Hence, according to the above-described example, high color development printing can be implemented on the infrared image member on a pixel basis.

<First Modification>

Figure 11:
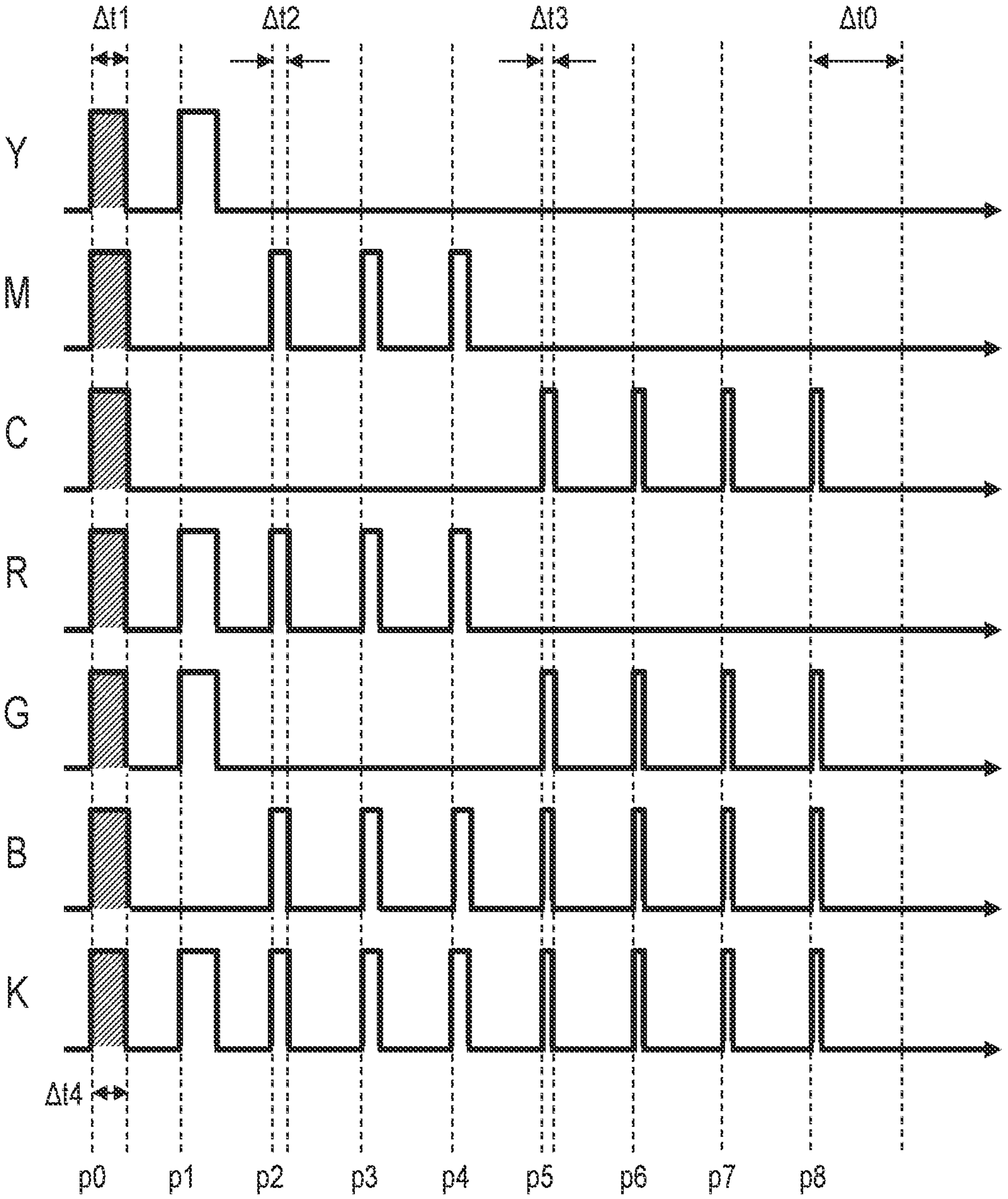
FIG. 11 is a view showing an example of heating pulses applied to the printhead of the printing apparatus according to the first modification of Example 1.

FIG. 11 is a view showing an example of heating pulses applied to the printhead of the printing apparatus according to the first modification of Example 1. Note that in FIG. 11, a description of the same components and symbols as described with reference to FIGS. 7 and 9 will be omitted, and only components unique to the first modification of Example 1 will be described here.

Here, preheating pulses indicated by dark hatching are always applied at timing p0. With this control, heating pulses for color development and preheating pulses are separated, and control on the circuit can be simplified.

As can easily be understood from FIG. 11, since the shape of pulses for developing the colors are extremely similar to each other, the difference of the degree of C color development between the C, G, and B colors, and the difference of the degree of M color development between the M, R, and B colors can be made small, and the color gradation can smoothly be expressed.

Furthermore, since the preheating pulse is given at one point (timing p0), only one type of preheating pulse needs to be set, and the preheating control parameter mount can be halved.

As a detailed processing method, brightness/density conversion using a three-dimensional lookup table is performed as follows. That is, $$C=3D\_LUT[R][G][B][0]$$

$$M=3D\_LUT[R][G][B][1]$$

$$Y=3D\_LUT[R][G][B][2]$$

$$P=3D\_LUT[R][G][B][3]$$

are calculated. Here, P represents the density value corresponding to the preheating pulse.

Next, pulse widths for implementing the C, M, and Y densities and preheating strengths are calculated. That is, $$c=1D\_LUT[C]$$

$$m=1D\_LUT[M]$$

$$y=1D\_LUT[Y]$$

$$p=1D\_LUT[P]$$

are calculated, and pulse widths at the timings p0 to p8 are set to p0=max(y, p), p1=y, p2=m, p3=m, p4=m, p5=c, p6=c, p7=c, and p8=c, and the pulses are composited.

Note that to implement the pulses generated by an electric circuit in a superimposed manner, the pulse width at the timing p0 is set to p0=max(m, p). Here, x or y represents the OR of the signal x and the signal y.

As described above, when the pulse width at each timing is controlled, the heating position by the preheating pulse is fixed, and a high color development print mode capable of smoothly implementing color gradation can be implemented by a simpler system.

<Second Modification>

Figure 12:
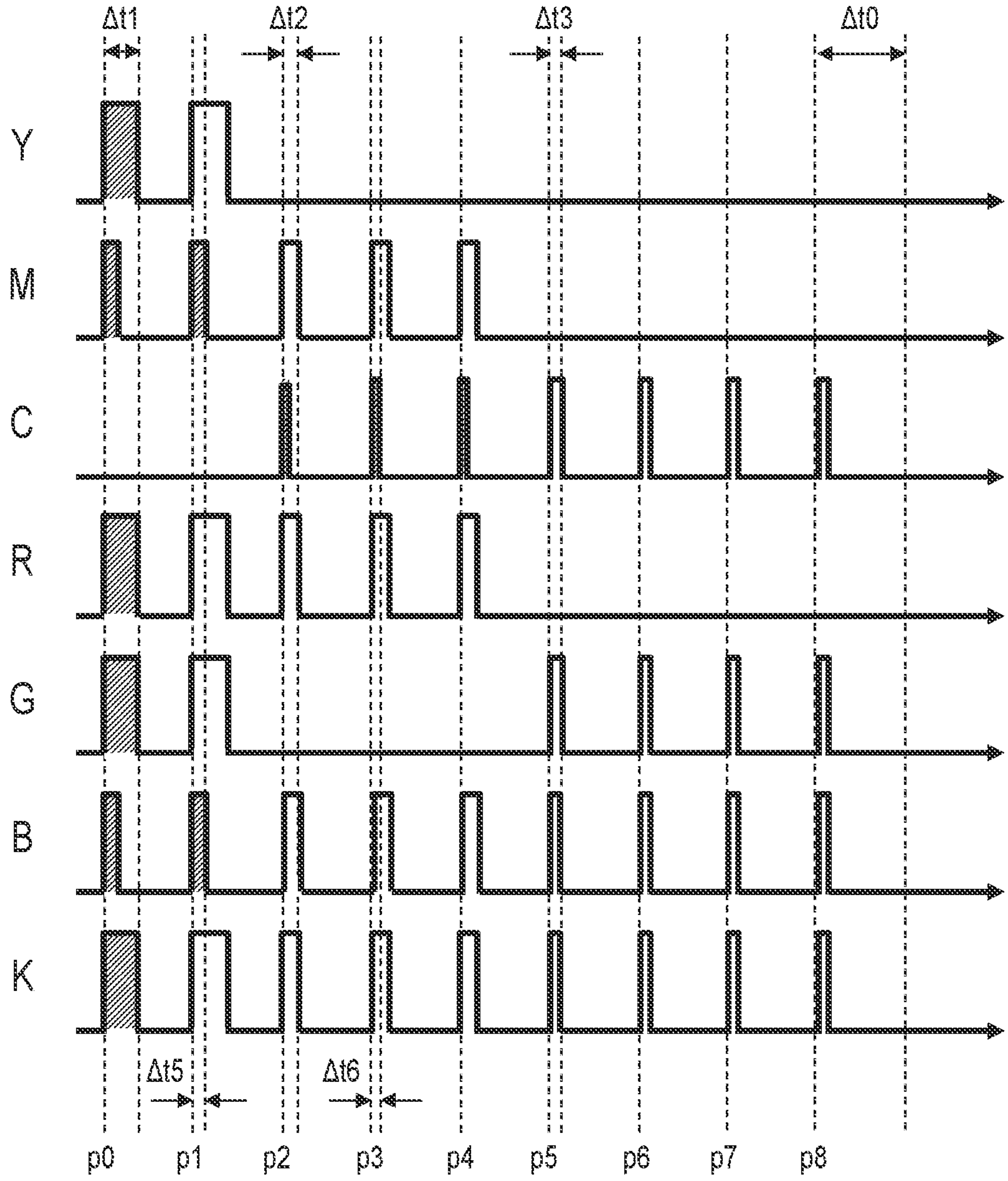
FIG. 12 is a view showing an example of heating pulses applied to the printhead of the printing apparatus according to the second modification of Example 1.

FIG. 12 is a view showing an example of heating pulses applied to the printhead of the printing apparatus according to the second modification of Example 1. Note that in FIG. 12, a description of the same components and symbols as described with reference to FIGS. 7 and 9 will be omitted, and only components unique to the second modification of Example 1 will be described here.

An example in which a dedicated preheating pulse is not set, and a preheating pulse is implemented using the color development pulses of other colors will be described here.

Of pulses shown in FIG. 12, heating pulse groups for high color development (indicated by dark hatching) are the following three pulse groups. That is, these include a pulse of a heating time Δt5, which is applied at timings p0 and p1 for M color development, a pulse of a heating time Δt6, which is applied at timings p2, p3, and p4 for C color development, and a pulse of the heating time Δt5, which is applied at the timings p0 and p1 for B color development.

Here, the heating times Δt5 and Δt6 for preheating satisfy

Δt5<heating time Δt1 of Y/2, and

Δt6<heating time Δt2 of M/2.

The reason why the heating times Δt5 and Δt6 for preheating have pulse widths equal to or less than the half of the heating time Δt1 of Y and the heating time Δt2 of M, respectively, is as follows. That is, the pulses are set in such widths that the colors are not developed only by the heating pulse for preheating, and even if heating is performed using color development pulses together, other colors are not developed, and the pulses can arbitrarily be set within the range.

Here, heating pulses for preheating are generated using heating pulses for color development of other colors, which are so weak that color development does not occur, thereby further simplifying control.

As a detailed processing method, to implement the heating pulses for preheating shown in FIG. 12, brightness/density conversion using a three-dimensional lookup table is performed as follows. That is, $$C=3D\_LUT[R][G][B][0]$$

$$M=3D\_LUT[R][G][B][1]$$

$$Y=3D\_LUT[R][G][B][2]$$

are calculated.

To implement the processing shown in FIG. 12, for example, in the single M color (R=255, G=0, B=255), $$C=3D\_LUT[255][0][255][0]=0$$

$$M=3D\_LUT[255][0][255][1]=\Delta t2$$

$$Y=3D\_LUT[255][0][255][2]=\Delta t1/2$$

need to be set.

Similarly, in the single C color (R=0, G=255, B=255), $$C=3D\_LUT[0][255][255][0]=\Delta t3$$

$$M=3D\_LUT[0][255][255][1]=\Delta t2/2$$

$$Y=3D\_LUT[0][255][255][2]=0$$

need to be set.

With this setting, the subsequent processing is performed as in the comparative example, and a high color development print mode can be implemented by a simple configuration without setting dedicated heating pulses for preheating independently of the pulses for color development.

Note that although the single M color, the single C color, and the B color have been described here, the preheating control according to the present invention can also be applied to halftone colors. For example, even in white to M color gradation, or white to C color or white to B color gradation, high color development printing can be implemented by setting appropriate heating pulses for preheating.

<Third Modification>

Figure 13:
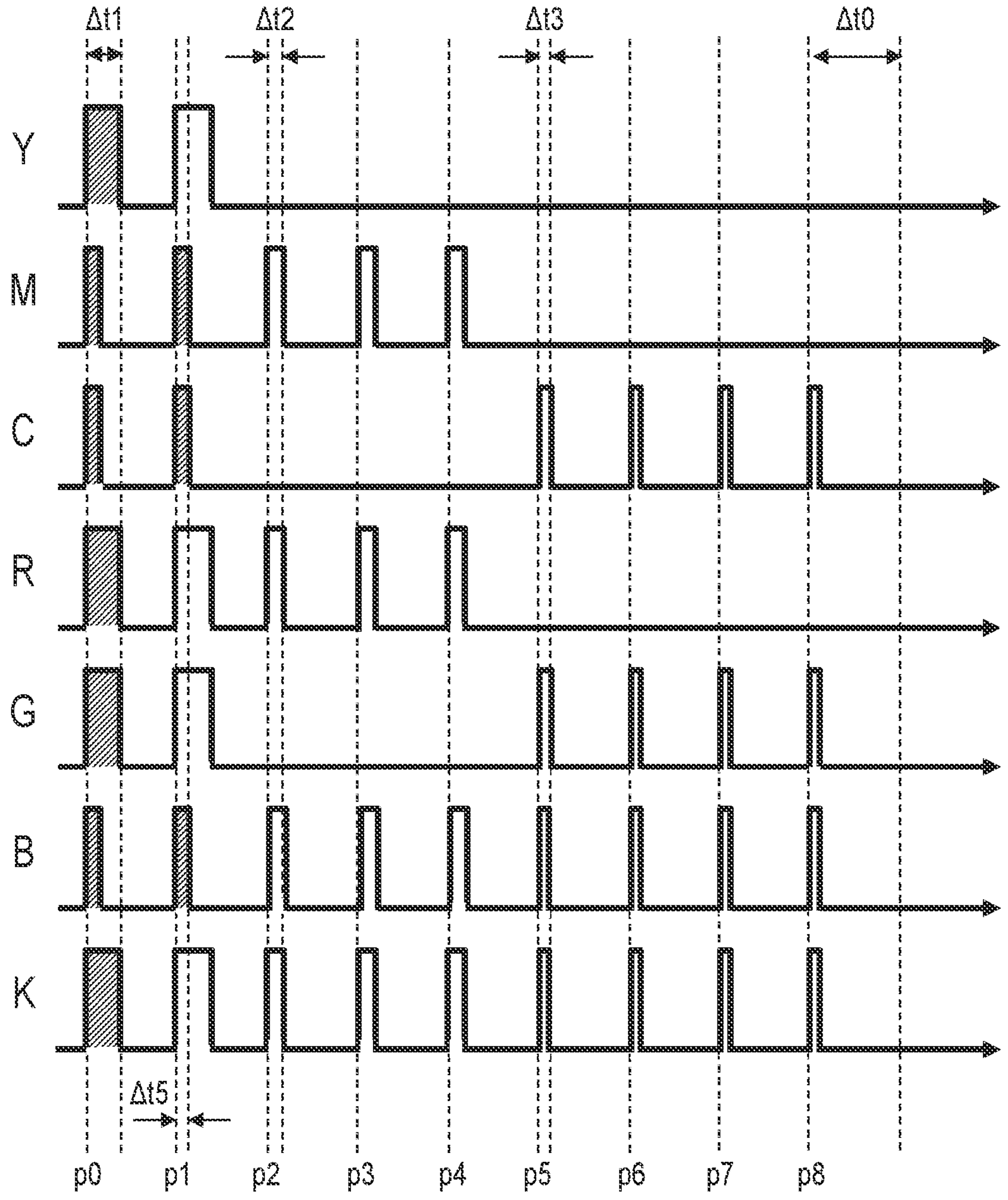
FIG. 13 is a view showing an example of heating pulses applied to the printhead of the printing apparatus according to the third modification of Example 1.

FIG. 13 is a view showing an example of heating pulses applied to the printhead of the printing apparatus according to the third modification of Example 1. Note that in FIG. 13, a description of the same components and symbols as described with reference to FIGS. 7 and 9 will be omitted, and only components unique to the third modification of Example 1 will be described here.

This example shows a configuration capable of simultaneously implementing both the advantage that color gradation can smoothly be expressed, which has been described in the first modification of Example 1, and the advantage that dedicated heating pulses for preheating can be formed without being set independently of the pulses for color development, which has been described in the second modification of Example 1.

Of pulses shown in FIG. 13, heating pulse groups for medium color development and high color development are the following three pulse groups. That is, these include a pulse of a heating time Δt5, which is applied at timings p0 and p1 for M color development, a pulse of the heating time Δt5, which is applied at the timings p0 and p1 for C color development, and a pulse of the heating time Δt5, which is applied at the timings p0 and p1 for B color development. Here, as described with reference to FIG. 12, the heating time Δt5 for preheating satisfies $$\Delta t5 < \text{heating time } \Delta t1 \text{ of } Y/2$$

As a detailed processing method, to implement the heating pulses for preheating shown in FIG. 13, brightness/density conversion using a three-dimensional lookup table is performed as follows. That is, $$C = 3D\_LUT[R][G][B][0]$$

$$M = 3D\_LUT[R][G][B][1]$$

$$Y = 3D\_LUT[R][G][B][2]$$

are calculated.

To implement the processing shown in FIG. 13, for example, in the single M color (R=255, G=0, B=255), $$C = 3D\_LUT[255][0][255][0] = 0$$

$$M = 3D\_LUT[255][0][255][1] = \Delta t2$$

$$Y = 3D\_LUT[255][0][255][2] = \Delta t1/2$$

need to be set.

Similarly, in the single C color (R=0, G=255, B=255), $$C = 3D\_LUT[0][255][255][0] = \Delta t3$$

$$M = 3D\_LUT[0][255][255][1] = 0$$

$$Y = 3D\_LUT[0][255][255][2] = \Delta t1/2$$

need to be set.

With this setting, the subsequent processing is performed as in the comparative example, and a high color development print mode can be implemented by a simple configuration without setting dedicated heating pulses for preheating independently of the pulses for color development.

Example 2

In Example 1, an example in which the preheating pulses are made to contribute to an increase of the color development time, and high color development is implemented has been described. In Example 2, an example in which the increase of color development time is used to improve the print speed will be described.

Figure 14:
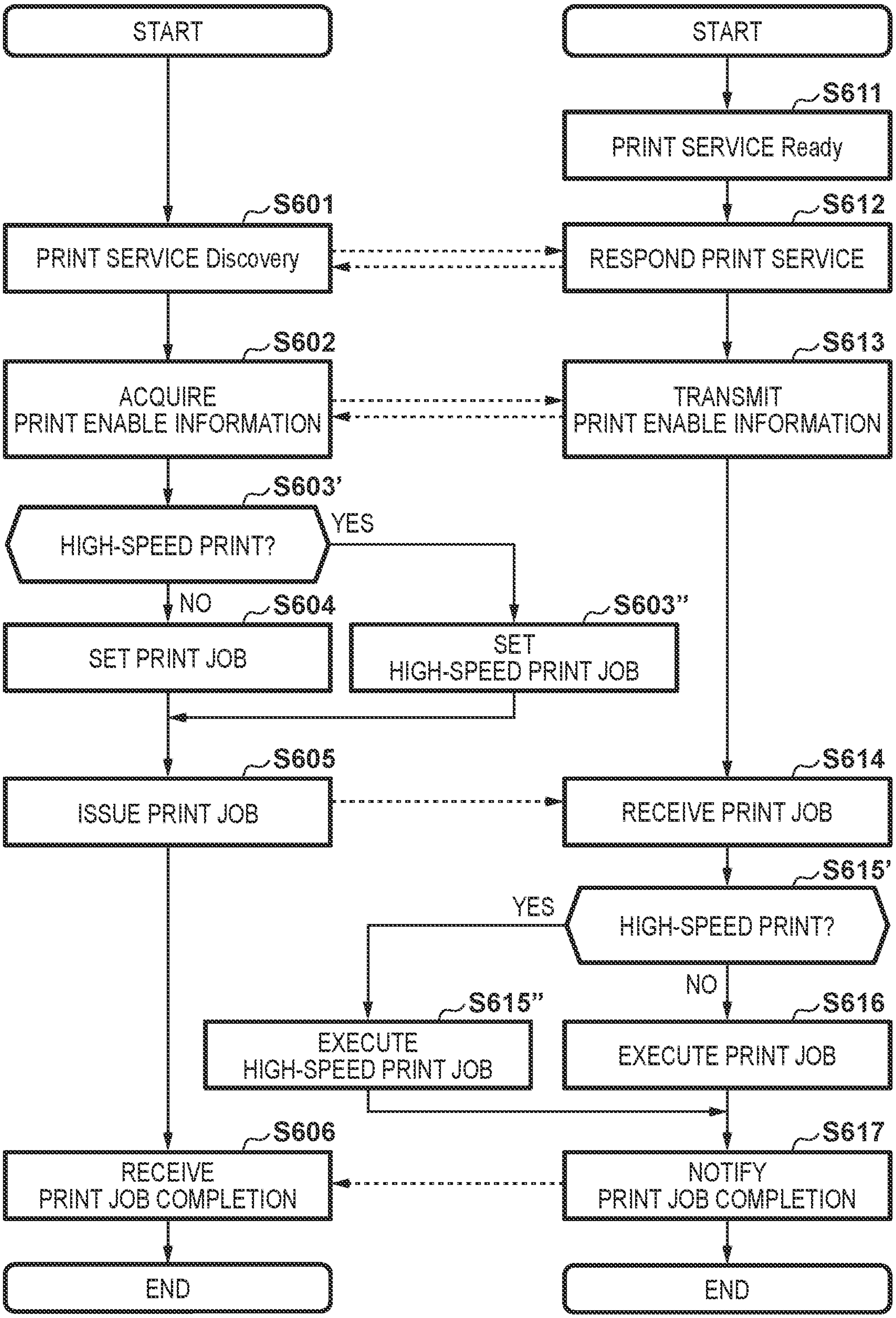
FIG. 14 is a flowchart showing processing of a printing apparatus and a host PC when a high-speed print service according to Example 2 is executed in a printing system.

FIG. 14 is a flowchart showing processing of a printing apparatus 40 and a host PC 50 when a high-speed print service according to Example 2 is executed in the above-described printing system. Note that in FIG. 14, for the same processing steps as already described with reference to FIG. 6, the same step numbers are added, and a description thereof will be omitted.

In step S611 in FIG. 14, the printing apparatus 40 confirms that it can perform printing and cope with high-speed printing, and starts the print service. Also, in response to the print service Discovery of the host PC 50 in step S601, in step S612, the printing apparatus 40 notifies the host PC that the printing apparatus is an apparatus capable of providing a print service including a high-speed print service. Hence, in step S613 as well, the printing apparatus 40 notifies the host PC of print enable information including the information of the high-speed print service.

In response to this, the host PC 50 displays, on the display or the like, information for selecting which one of the normal print service and the high-speed print service is to be used, more specifically, display and choices of "print service" and "high-speed print service" and notifies the user of this. That is, in step S603', the process checks whether an instruction from the user is "print service" or "high-speed print service".

Here, if the selection result by the user is "print service", the process advances to step S604 to execute the same processing as described with reference to FIG. 6. If the selection result is "high-speed print service", the process advances to step S603". In step S603", the host PC 50 constructs a user interface for high-speed print job creation based on the print enable information. More specifically, based on the print enable information from the printing apparatus 40, a print size, a printable paper size, and the like are displayed on the screen, and the user is caused to input a selection instruction according to this. In addition to this, a high-speed print job is created while causing the user to recognize high-speed printing by a method of displaying a preview image at a high speed as an animation. After creation of the high-speed print job, the process advances to step S605.

On the other hand, in step S615', the printing apparatus 40 checks whether the received print job is a normal print job or a high-speed print job. Here, if the received print job is a high-speed print job, the process advances to step S615" to execute the high-speed print job in a high-speed print mode, and then advances to step S617. On the other hand, if the received print job is a normal print job, the same processing as described with reference to FIG. 6 is executed.

Figure 15:
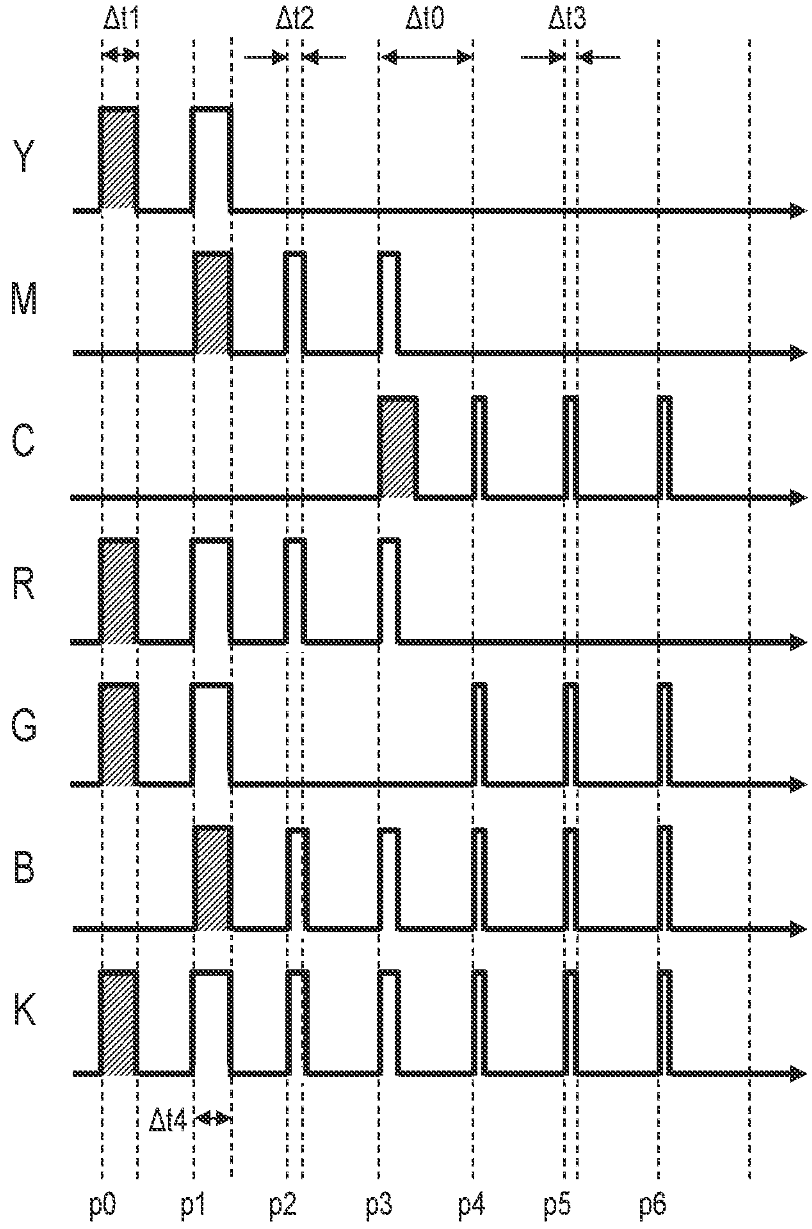
FIG. 15 is a view showing an example of heating pulses applied to the printhead of the printing apparatus according to the processing of Example 2.

FIG. 15 is a view showing an example of heating pulses applied to the printhead of the printing apparatus according to the processing of Example 2. Note that in FIG. 15, a description of the same components and symbols as described with reference to FIG. 7 or 9 will be omitted, and only components unique to Example 2 will be described here.

In this example, using the effect of increasing the number of pulses contributing to color development by the heating pulses for preheating, the print speed is improved while maintaining the control configuration shown in the comparative example for the density.

As shown in FIG. 15, when developing yellow (Y), to implement control for satisfying a region 21 shown in FIG. 5 (the temperature of the printhead is relatively high, and the heating time is relatively short), a heating pulse of a heating time Δt1 is applied twice at a time interval Δt0. When developing magenta (M), a heating pulse of a heating time Δt2 is applied twice at the time interval Δt0. Similarly, when developing cyan (C), a heating pulse of a heating time Δt3 is applied three times at the time interval Δt0.

In comparison of FIG. 15 and FIG. 7, since the number of M heating pulses and the number of C heating pulses are each smaller by one in the conventional method, the heating pulses are too short for the single M color, the single C color, and the M color in B, and color development is weak. On the other hand, for the remaining colors, color development weakens little due to the following reasons. That is, in the R color, heating for Y color development functions as preheating for M color development, in the G color, heating for Y color development functions as preheating for C color development, and in the K color, heating for Y color development functions as preheating for M and C color development.

Hence, as shown in FIG. 15, a heating pulse for preheating (a pulse indicated by dark hatching in FIG. 15) with a long pulse width is applied once immediately before the start of the heating pulses for the single M color, the single C color, and the M color in B.

When the heating pulse for preheating with the long pulse width is used in this way, image formation of one pixel can be implemented by a total of seven timings p0 to p6 in this example, as compared to the comparative example or Example 1 in which a total of nine timings p0 to p8 are needed. As a result, printing can be performed at a speed higher by about 20%.

Note that the image processing of generating heating pulses and driving the printhead according to Example 2 is almost the same as the processing described with reference to FIG. 10 in Example 1, and a description of the same processing will be omitted.

In this example, brightness/density conversion and output correction processing are executed in the same way as the pulse control described with reference to FIG. 10 of Example 1. In the next preheating pulse generation & composition of step S1006, the pulse widths at the timings p0 to p6 are set to p0=y, p1=max(y, pm), p2=m, p3=max(m, pc), p4=c, p5=c, and p6=c, and the pulses are composited.

Note that to implement the pulses generated by an electric circuit in a superimposed manner, p1=y or pm, and p3=m or pc are set.

According to the above-described example, the increase of the color development time by the heating pulse for preheating is used, thereby improving the print speed.

<First Modification>

Figure 16:
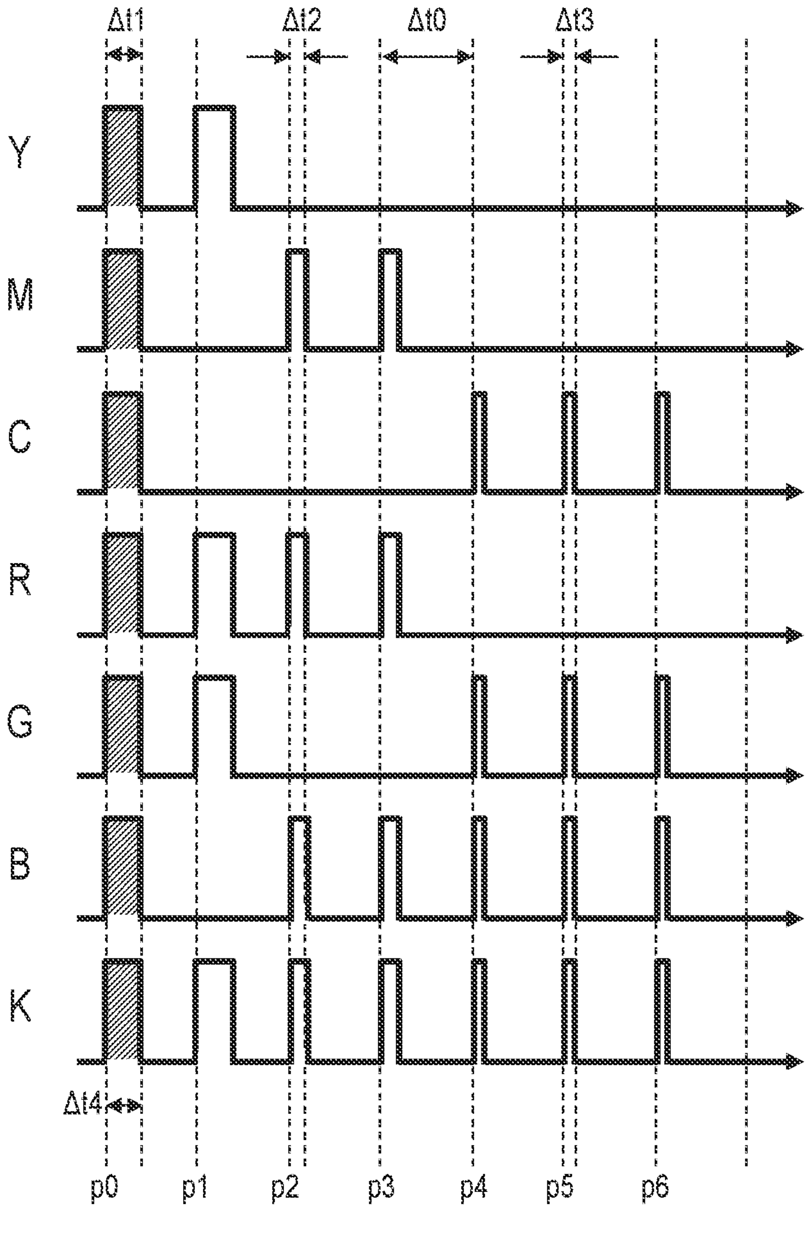
FIG. 16 is a view showing an example of heating pulses applied to the printhead of the printing apparatus according to the first modification of Example 2.

FIG. 16 is a view showing an example of heating pulses applied to the printhead of the printing apparatus according to the first modification of Example 2. Note that in FIG. 16, a description of the same components and symbols as described with reference to FIGS. 7 and 9 will be omitted, and only components unique to the first modification of Example 2 will be described here.

This modification shows an example in which both the improvement of the print speed by the increase of the color development time, which has been described in Example 2, and the improvement of the smoothness of gradation and the simple control configuration, which have been described in Example 1, are simultaneously implemented.

In this modification, as shown in FIG. 16, as described above in the first modification of Example 1, the heating pulse for preheating is applied at the timing p0. Also, as in Example 2, when developing magenta (M), a drive pulse of the heating time Δt2 is applied twice in total at the time interval Δt0. Also, when developing cyan (C), a drive pulse of the heating time Δt3 is applied three times in total at the time interval Δt0, as in Example 2.

Note that image processing according to this modification is the same as the processing described with reference to the flowchart of FIG. 10, and a description thereof will be omitted.

In this modification, brightness/density conversion and output correction processing are executed in the same way as the pulse control described with reference to FIG. 10 of Example 1. In the next preheating pulse generation & composition of step S1006, the pulse widths at the timings p0 to p6 are set to p0=max(y, p), p1=y, p2=m, p3=m, p4=c, p5=c, and p6=c, and the pulses are composited.

Note that to implement the pulses generated by an electric circuit in a superimposed manner, p0=y or p is set.

With this control, the heating pulse for preheating is used at the start timing of Y color development to increase the color development time and improve the print speed. In addition, the improvement of the smoothness of gradation and the simple configuration can simultaneously be implemented.

<Second Modification>

Figure 17:
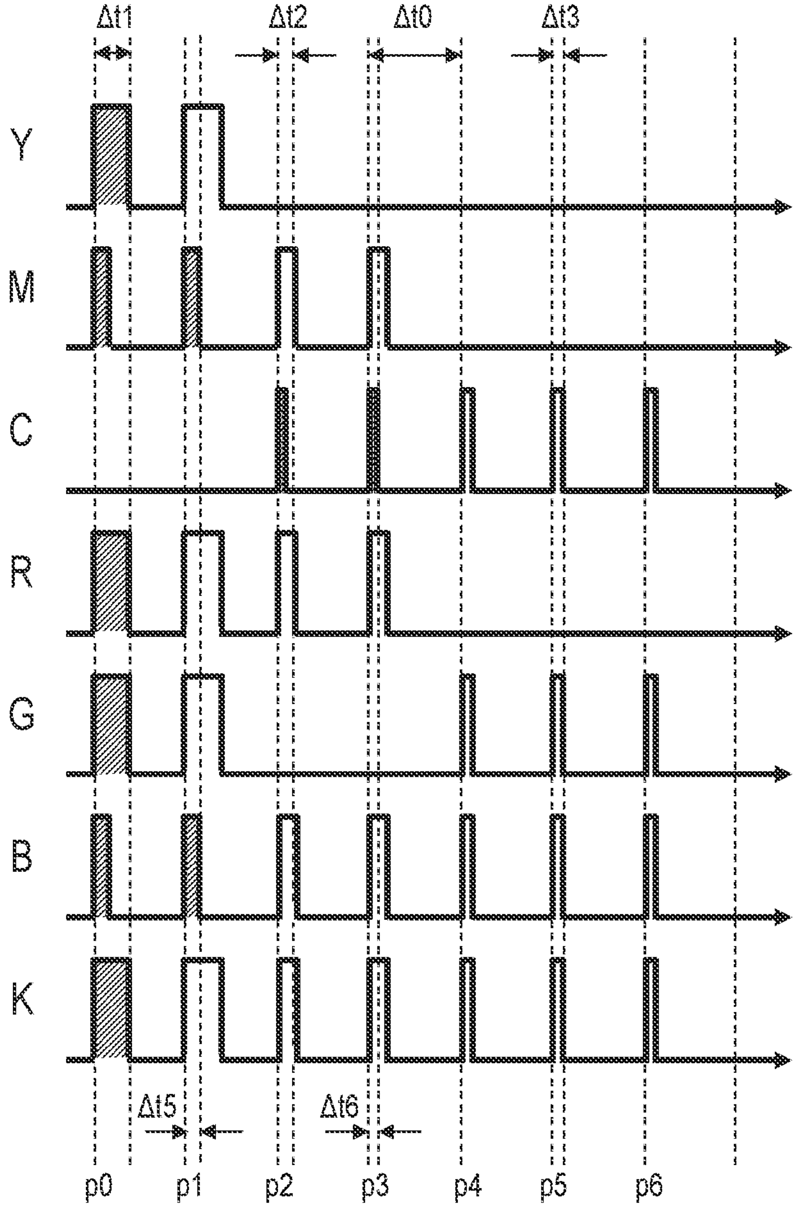
FIG. 17 is a view showing an example of heating pulses applied to the printhead of the printing apparatus according to the second modification of Example 2.

FIG. 17 is a view showing an example of heating pulses applied to the printhead of the printing apparatus according to the second modification of Example 2. Note that in FIG. 17, a description of the same components and symbols as described with reference to FIGS. 7 and 9 will be omitted, and only components unique to the second modification of Example 2 will be described here.

This modification shows an example in which both the improvement of the print speed by the increase of the color development time, which has been described in Example 2, and the configuration for simplifying control using color development pulses of other colors as heating pulses for preheating, which has been described in the second modification of Example 1, are simultaneously implemented.

In this modification, as described in the second modification of Example 1, color development pulses of other colors are used as heating pulses for preheating and applied.

More specifically, to implement the heating pulses for preheating shown in FIG. 17, brightness/density conversion using a three-dimensional lookup table is performed as follows. That is, $$C=3D\_LUT[R][G][B][0]$$

$$M=3D\_LUT[R][G][B][1]$$

$$Y=3D\_LUT[R][G][B][2]$$

are calculated. To implement the processing shown in FIG. 17, for example, in the single M color (R=255, G=0, B=255), $$C=3D\_LUT[255][0][255][0]=0$$

$$M=3D\_LUT[255][0][255][1]=\Delta t2$$

$$Y=3D\_LUT[255][0][255][2]=\Delta t1/2$$

need to be set.

Similarly, in the single C color (R=0, G=255, B=255), $$C=3D\_LUT[0][255][255][0]=\Delta t3$$

$$M=3D\_LUT[0][255][255][1]=\Delta t2/2$$

$$Y=3D\_LUT[0][255][255][2]=0$$

need to be set.

With this setting, since the subsequent processing is executed as in the comparative example, a high-speed print mode can be implemented by a simple control configuration without independently setting dedicated heating pulses for preheating and pulses for color development. Also, in this example, as in the second modification of Example 1, for example, even in white to M color gradation, or white to C color or white to B color gradation, high-speed printing can be implemented by setting appropriate heating pulses for preheating.

<Third Modification>

Figure 18:
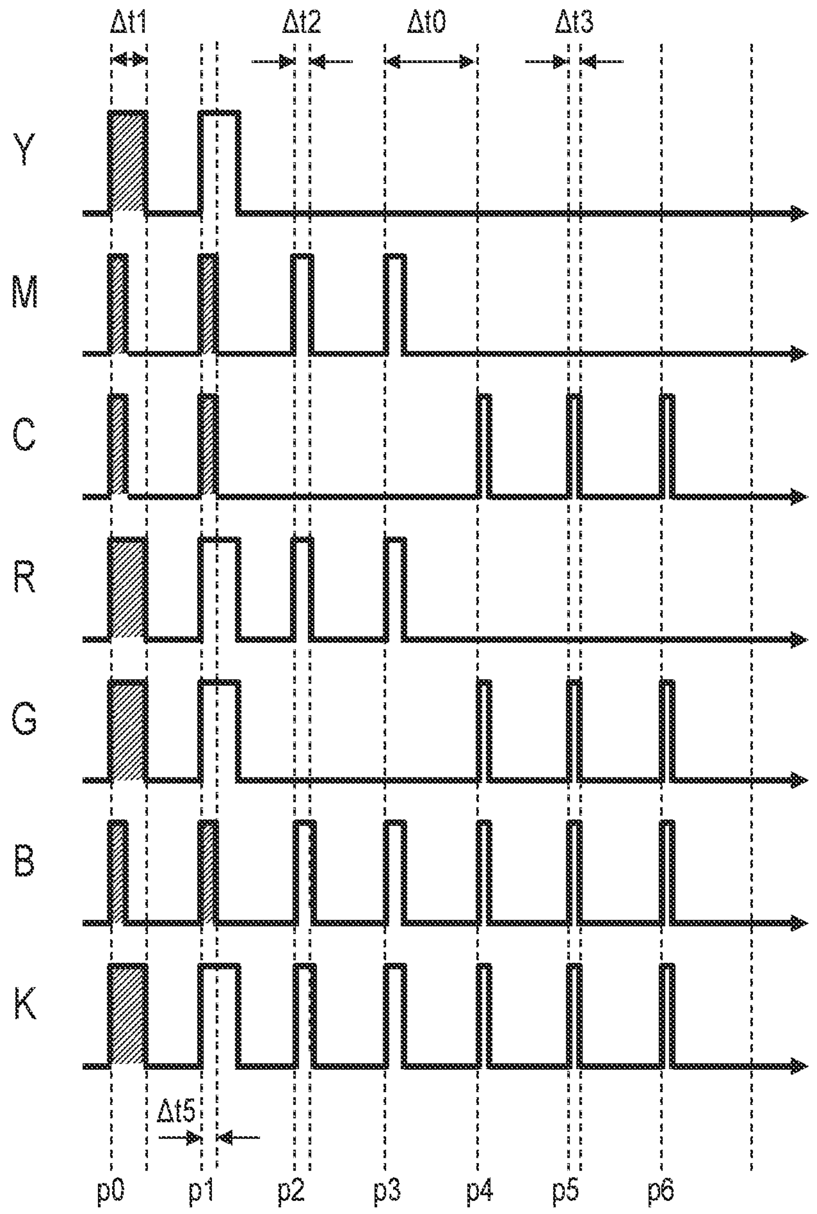
FIG. 18 is a view showing an example of heating pulses applied to the printhead of the printing apparatus according to the third modification of Example 2.

FIG. 18 is a view showing an example of heating pulses applied to the printhead of the printing apparatus according to the third modification of Example 2. Note that in FIG. 18, a description of the same components and symbols as described with reference to FIGS. 7 and 9 will be omitted, and only components unique to the third modification of Example 2 will be described here.

This modification shows an example in which both the advantage that color gradation can smoothly be expressed, which has been described in the first modification of Example 2, and the advantage that dedicated heating pulses for preheating and the pulses for color development are not independently set, which has been described in the second modification of Example 1 are simultaneously implemented.

Of pulses shown in FIG. 18, heating pulse groups for medium color development and high color development are the following three pulse groups. That is, these include a pulse of the heating time Δt5, which is applied at the timings p0 and p1 for M color development, a pulse of the heating time Δt5, which is applied at the timings p0 and p1 for C color development, and a pulse of the heating time Δt5, which is applied at the timings p0 and p1 for B color development. Here, as shown in FIG. 17, the heating time Δt5 for preheating satisfies Δt5<heating time Δt1 of Y/2.

More specifically, to implement the heating pulses for preheating shown in FIG. 18, brightness/density conversion using a three-dimensional lookup table is performed as follows. That is, $$C=3D\_LUT[R][G][B][0]$$

$$M=3D\_LUT[R][G][B][1]$$

$$Y=3D\_LUT[R][G][B][2]$$

are calculated. To implement the processing shown in FIG. 18, for example, in the single M color (R=255, G=0, B=255), $$C=3D\_LUT[255][0][255][0]=0$$

$$M=3D\_LUT[255][0][255][1]=\Delta t2$$

$$Y=3D\_LUT[255][0][255][2]=\Delta t1/2$$

need to be set.

Similarly, in the single C color (R=0, G=255, B=255), $$C=3D\_LUT[0][255][255][0]=\Delta t3$$

$$M=3D\_LUT[0][255][255][1]=0$$

$$Y=3D\_LUT[0][255][255][2]=\Delta t1/2$$

need to be set.

With this setting, the subsequent processing is executed as in the comparative example, and a high-speed print mode can be implemented by a simple configuration without setting dedicated heating pulses for preheating independently of the pulses for color development.

Also, although the processes of steps S1003 to S1006 in FIG. 10 are individually executed, the processes need not always be executed individually and may be executed in one step, as will be described below. That is, the pulse widths at the timings p0 to p6 may be calculated as follows using a three-dimensional lookup table. That is, $$p0=3D\_LUT[R][G][B][0]$$

$$p1=3D\_LUT[R][G][B][1]$$

$$p2=3D\_LUT[R][G][B][2]$$

$$p3=3D\_LUT[R][G][B][3]$$

$$p4=3D\_LUT[R][G][B][4]$$

$$p5=3D\_LUT[R][G][B][5]$$

$$p6=3D\_LUT[R][G][B][6]$$

are calculated.

The above-described setting of the timings p0 to p6 is done in a case where the processes of Example 2 are integrated into one step.

For the processing of Example 1, $$p7=3D\_LUT[R][G][B][7]$$

$$p8=3D\_LUT[R][G][B][8]$$

are added.

When these operations are performed, the pulse widths at the timings for driving the heater of a printhead 30 are uniquely determined, and the processing can be implemented by a very simple configuration.

Also, when the above-described configuration is employed, pulses can arbitrarily be controlled in accordance with the combination of the three, Y, M, and C colors, and the degree of freedom of control becomes very large.

Example 3

In Example 1, an example in which the preheating pulses are made to contribute to an increase of the color development time, and high color development is implemented has been described. In Example 2, an example in which the increase of color development time is used to improve the print speed has been described. These examples are examples in which brightness/density conversion using a 3D_LUT is executed for each color component of the printing apparatus (thermal printer) from each pixel value of image data to decide preheating pulses. In this example, an example in which to implement the improvement of color development at an image start end IA in the conveyance direction of a print medium (infrared image member) 10 shown in FIG. 1, concerning each pixel in the conveyance direction, a preheating pulse for the immediately preceding pixel thereof is decided from the value of each pixel will be described.

As described in Example 1, heating for color development of a certain color has a preheating effect for another color to be developed after the color. That is, heating executed precedingly in each pixel has the effect of preheating for later heating. The preheating effect by the preceding heating occurs not only in a pixel but also between pixels.

Figure 19:
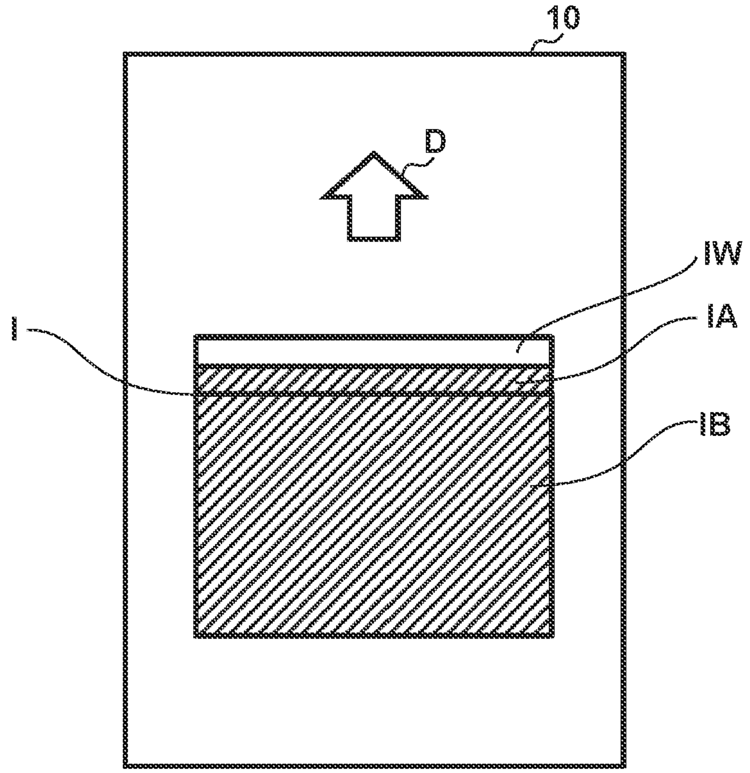
FIG. 19 is a view showing the relationship between an image I formed on the infrared image member 10 and a conveyance direction D of the infrared image member 10.

FIG. 19 is a view showing the relationship between an image I formed on the infrared image member 10 and a conveyance direction D of the infrared image member 10.

Referring to FIG. 19, a hatched portion is the image I. In the image I, concerning the conveyance direction D, a pixel region in which the pixels on the most downstream side are arranged in a direction crossing the conveyance direction D is indicated as an image start end IA, and the remaining region is indicated as an internal region IB. Also, concerning the conveyance direction D, a region immediately before the image I, where pixels without color development data are arranged in the direction crossing the conveyance direction D, is indicated as an immediately preceding pixel region IW. In FIG. 19, for example, if the image I is printed using the heating pulses shown in FIG. 7 in the comparative example, the preheating effect in the immediately preceding pixel region IW to the image start end IA is smaller than the preheating effect between pixels in the internal region IB of the image. This is because since there are no heating pulses for white pixels that continue up to the immediately preceding pixel region IW of the image start end IA, pixels at the image start end IA receive little contribution of preheating from the immediately preceding pixel region IW.

Also, in the single C color development in FIG. 7, p5 to p7 represent preheating pulses, and p8 represents an image formation pulse, as described above. At the image start end IA, the necessary number of preheating pulses tends to increase, and the number of image formation pulses tends to decrease as compared to the internal region IB. That is, as compared to the color development in the internal region IB, the color development region at the image start end IA is narrow in the conveyance direction, and an image of low color development properties is formed.

Figure 20:
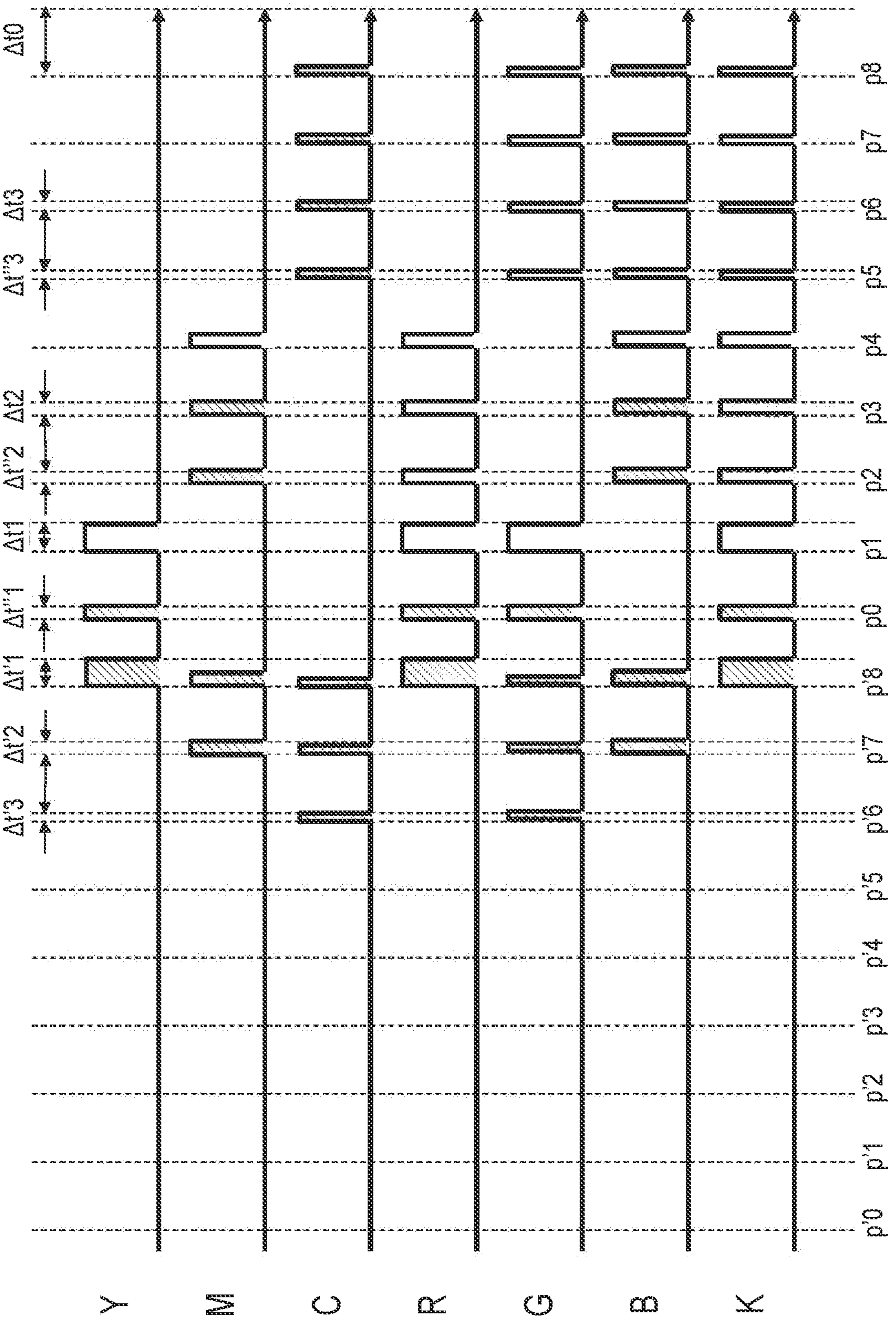
FIG. 20 is a view showing an example of heating pulses applied to the printhead of a printing apparatus according to Example 3.

FIG. 20 is a view showing an example of heating pulses applied to a printhead 30 of a printing apparatus 40 according to Example 3. Note that in FIG. 20, a description of the same components and symbols as described with reference to FIG. 7 will be omitted, and only components unique to Example 3 will be described here.

In FIG. 20, p'0 to p'8 represent heating timings in the immediately preceding pixel region IW of the image start end IA, and p0 to p8 represent heating timings at the image start end IA. The heating pulses at the image start end IA shown in FIG. 20 are based on the heating pulses shown in FIG. 7, and this also applies to FIG. 21 and FIGS. 22A and 22B to be described later. In FIG. 20 as well, hatching indicates a preheating pulse. Heat by preheating pulses applied to the immediately preceding pixel region IW preheats the immediately preceding pixel region IW, as a matter of course, and also provides the preheating effect to the image start end IA as well. The heat amount by the pulses applied by the printhead 30 propagates not only in the depth direction of the infrared image member 10 but also partially in the conveyance direction to heat the infrared image member 10. For this reason, the preheating pulses for the immediately preceding pixel region IW have the preheating effect for the image start end IA. Hence, the difference between the preheating effect for the image start end IA and that for the internal region TB shown in FIG. 20 can be reduced. More specifically, details of the application timings of the preheating pulses that form the heating pulses of the colors and the image formation pulses are as follows. That is,

| Colors | Preheating pulse application timing in immediately preceding pixel region IW | Preheating pulse application timing at image start end IA | Image formation pulse application timing at image start end IA |
|---|---|---|---|
| Y | p'8 | p0 | p1 |
| M | p'7, p'8 | p2, p3 | p4 |

-continued

| Colors | Preheating pulse application timing in immediately preceding pixel region IW | Preheating pulse application timing at image start end IA | Image formation pulse application timing at image start end IA |
|---|---|---|---|
| C | p'6, p'7, p'8 | p5, p6, p7 | p8 |
| R | p'8 | p0 | p1 to p4 |
| G | p'6, p'7, p'8 | p0 | p1, p5 to p8 |
| B | p'7, p'8 | p2, p3 | p4 to p8 |
| K | p'8 | p0 | p1 to p6 |

Since the heating pulses applied to the immediately preceding pixel region IW are preheating pulses, unlike the image start end IA, color development does not occur in the immediately preceding pixel region IW. Also, in FIG. 20, the preheating pulses for the immediately preceding pixel region IW reflect the feature of each color.

First, one feature of preheating of the immediately preceding pixel region IW in a case where single color development of Y, M, or C is performed at the image start end IA will be described.

The preheating pulse widths of Y, M, and C in an immediately preceding pixel P hold a relationship given by $Y>M>C$ ($\Delta t'1>\Delta t'2>\Delta t'3$). Here, the description will be made using preheating pulse widths. However, a so-called duty ratio or duty cycle may be used for the description. The duty ratio or duty cycle is the ratio of a period where a pulse (signal) is not zero in a certain period. In the example shown in FIG. 20, for the preheating pulse of Y in the immediately preceding pixel region IW, the certain period is $\Delta t0$, and a period where the signal is not zero in the period $\Delta t0$ is $\Delta t'1$. Hence, the duty ratio of the preheating pulse of Y in the immediately preceding pixel region IW is $\Delta t'1/\Delta t0$. Similarly, the preheating pulse duty ratio of M in the immediately preceding pixel region IW is $\Delta t'2/\Delta t0$, and the preheating pulse duty ratio of C in the immediately preceding pixel region IW is $\Delta t'3/\Delta t0$.

In FIG. 20, $\Delta t''$, $\Delta t'2$, and $\Delta t'3$ are illustrated as single pulses of different widths. However, the preheating pulses are not limited to these. For example, each of the pulse widths $\Delta t''$, $\Delta t'2$, and $\Delta t'3$ may be divided into pulses of a narrower width. In this case, at $\Delta t0$, the ratio of the sum of divided periods where the signal is not zero is the duty ratio or duty cycle. The duty ratios of the preheating pulses of Y, M, and C in the immediately preceding pixel P hold a relationship given by $Y>M>C$ ($\Delta t'1/\Delta t0>\Delta t'2/\Delta t0>\Delta t'3/\Delta t0$).

Next, another feature of preheating of the immediately preceding pixel region IW in a case where single color development of Y, M, and C is performed at the image start end IA will be described.

The numbers of application timings of preheating pulses of Y, M, and C in the immediately preceding pixel region IW hold $Y<M<C$. In the example shown in FIG. 20, Y (once)$<$M (twice)$<$C (three times). Letting $\Delta t0$ be the pulse period, since the period is time, the total application time can be calculated by period x number of times. The application times of preheating pulses of Y, M, and C in the immediately preceding pixel region IW hold $Y<M<C$.

Y is formed in an image forming layer 14 shown in FIG. 4, and an activation temperature Ta3 is higher than activation temperatures Ta2 and Ta1 of image forming layers 16 and 18. For this reason, the preheating pulse width is set large to apply a high temperature to the infrared image member 10. At this time, the number of application timings is decreased such that the image forming layer 16 of M and the image forming layer 18 of C do not reach the activation temperatures Ta2 and Ta1. On the other hand, the activation temperature Ta1 of the image forming layer 18 that develops C is lowest. For this reason, the preheating pulse width is set small to apply a low temperature to the infrared image member 10. At this time, since thermal diffusion of the low temperature generated by the applied preheating pulse is suppressed by a spacer layer 15 and a spacer layer 17 in the halfway, heat of the low temperature is diffused to the image forming layer 18 of C by increasing the number of application timings. Since the image forming layer 16 that develops M is located between the image forming layer 14 of Y and the image forming layer 18 of C, both the preheating pulse width and the number of application timings are between Y and C.

Furthermore, a feature of preheating of the immediately preceding pixel region IW in a case where R color development and K color development are performed at the image start end IA will be described.

In this case, the preheating pulse width is Δt'1, and the application timing is p'8. Since the image forming layer 14 of Y is used to develop R and K, the feature of the preheating pulse is the same as in single Y color development.

Next, a feature of preheating of the immediately preceding pixel region IW in a case where G color development is performed at the image start end IA will be described.

In this case, the preheating pulse width is Δt'3, and the application timings are p'6, p7, and p'8. Even when developing G, the image forming layer 14 of Y is used. Although the preheating pulse of single Y color development provides a particularly effective preheating effect for the image forming layer 14 of Y, the preheating effect for the image forming layer 18 of C is not large. In G color development, giving priority to the preheating effect for p5, p6, and p7 where C is developed at the image start end IA, the same preheating pulse as in single C color development is preferably used. Since the image forming layer 14 of Y is located at a position shallower than the image forming layer 18 of C, the preheating temperature can be made higher than the image forming layer 18 even if the preheating pulse with priority on C color development is used.

Finally, a feature of preheating of the immediately preceding pixel region IW in a case where B color development is performed at the image start end IA will be described.

In this case, the preheating pulse width is Δt'2, and the application timings are p7 and p'8. Since the image forming layer 16 of M is used to develop B, the feature of the preheating pulse is the same as in single M color development. By the preheating pulse and the preheating pulses at the application timings p2 and p3 at the image start end IA, an application time to preheat the image forming layer 18 of C can be generated.

As described above, it is suitable to make the preheating pulses for the immediately preceding pixel region IW have the above-described features in accordance with the colors to be developed at the image start end IA.

Concerning R, B, and K, the same preheating pulse as in single color development of the image forming layer with the highest activation temperature in the image forming layers to be activated is applied to the immediately preceding pixel region IW, as described above. This is because the image forming layers are activated in the descending order of activation temperature at the image start end IA. Note that the present invention is not limited to this. Even if the preheating pulse in single color development of another image forming layer is used, at least a preheating effect is obtained for any layer.

Figure 21:
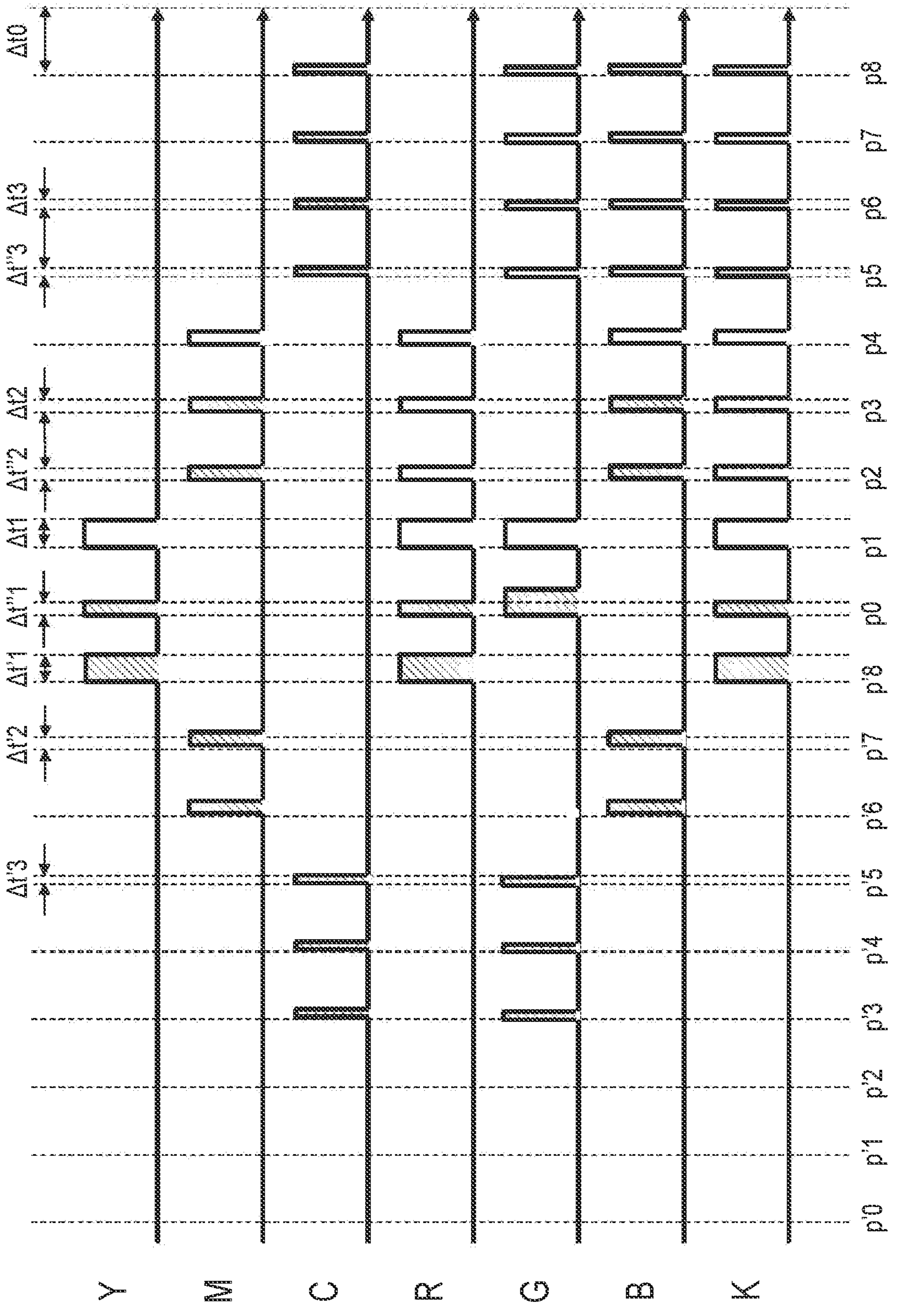
FIG. 21 is a view for explaining the application timings of preheating pulses in an immediately preceding pixel region IW different from FIG. 20.

FIG. 21 is a view for explaining the application timings of preheating pulses for the immediately preceding pixel region IW different from FIG. 20. That is,

| Colors | Preheating pulse application timing in immediately preceding pixel region IW | Preheating pulse application timing at image start end IA | Image formation pulse application timing at image start end IA |
|---|---|---|---|
| Y | p'8 | p0 | p1 |
| M | p'6, p'7 | p2, p3 | p4 |
| C | p'3, p'4, p'5 | p5, p6, p7 | p8 |
| R | p'8 | p0 | p1 to p4 |
| G | p'3, p'4, p'5 | p0 | p1, p5 to p8 |
| B | p'6, p'7 | p2, p3 | p4 to p8 |
| K | p'8 | p0 | p1 to p6 |

In the example shown in FIG. 21, no preheating pulses overlap at the application timings of Y, M, and C in the immediately preceding pixel region IW. The temperature change in the image forming layer 14 of Y with respect to the elapsed time and that in the image forming layer 16 of M are compared. Since the change is smaller in the image forming layer 16 located at a deeper position, the time after the temperature is raised by the preheating pulses at the application timings p'6 and p'7 until the temperature lowers becomes long. Since the image forming layer 18 of C is located at a still deeper position, the time until the temperature lowers becomes longer. Hence, even if a non-application timing is provided after the application of the preheating pulses of M and C in the immediately preceding pixel region IW, as shown in FIG. 21, the preheating effect is obtained. However, since lowering of the temperature occurs at a timing where the preheating pulse is not applied, the preheating effect to the image start end IA is higher in the example shown in FIG. 20.

Figure 22A:
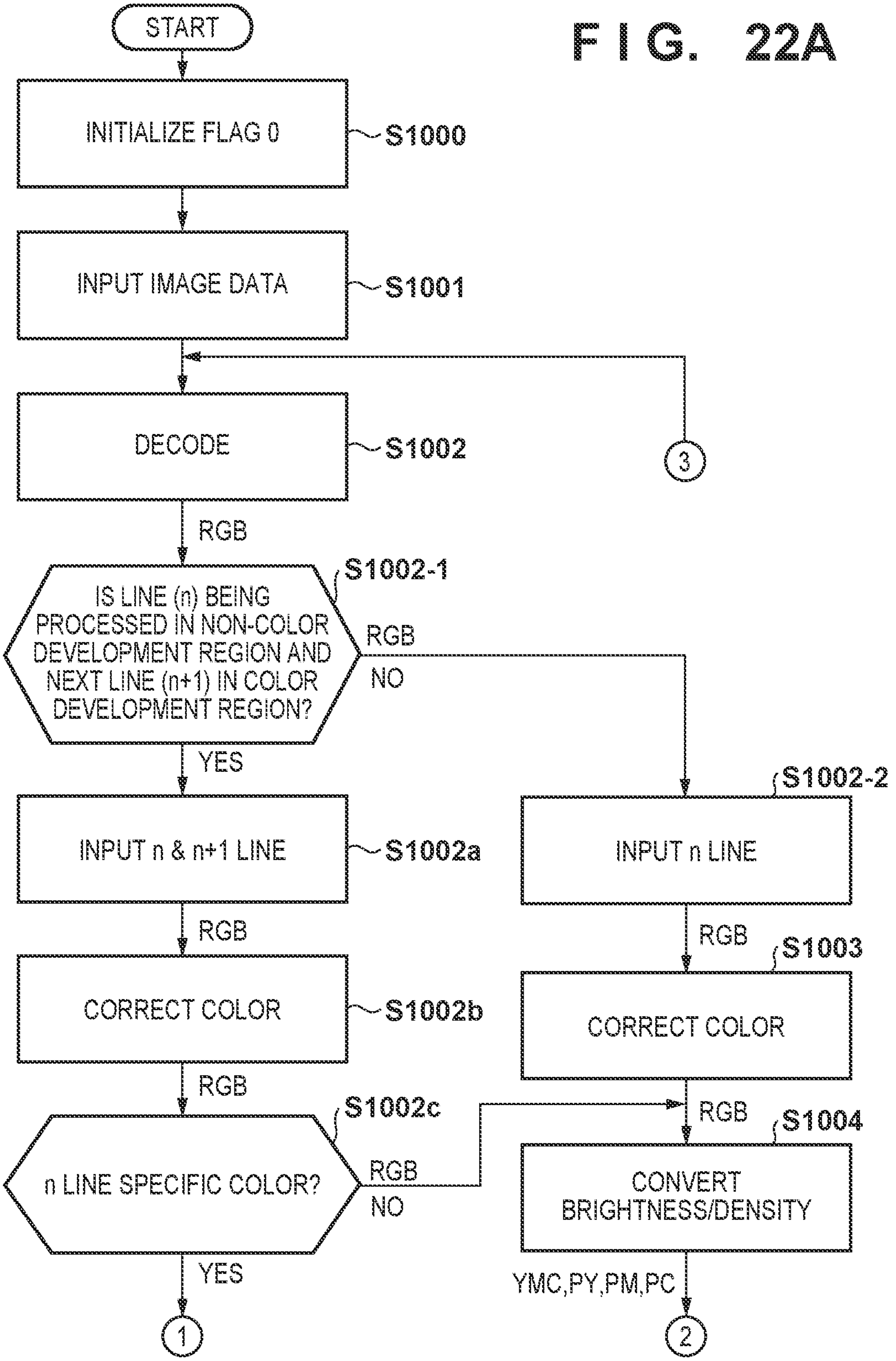
FIG. 22A is a flowchart showing image processing of generating heating pulses and driving the printhead according to Example 3.
Figure 22B:
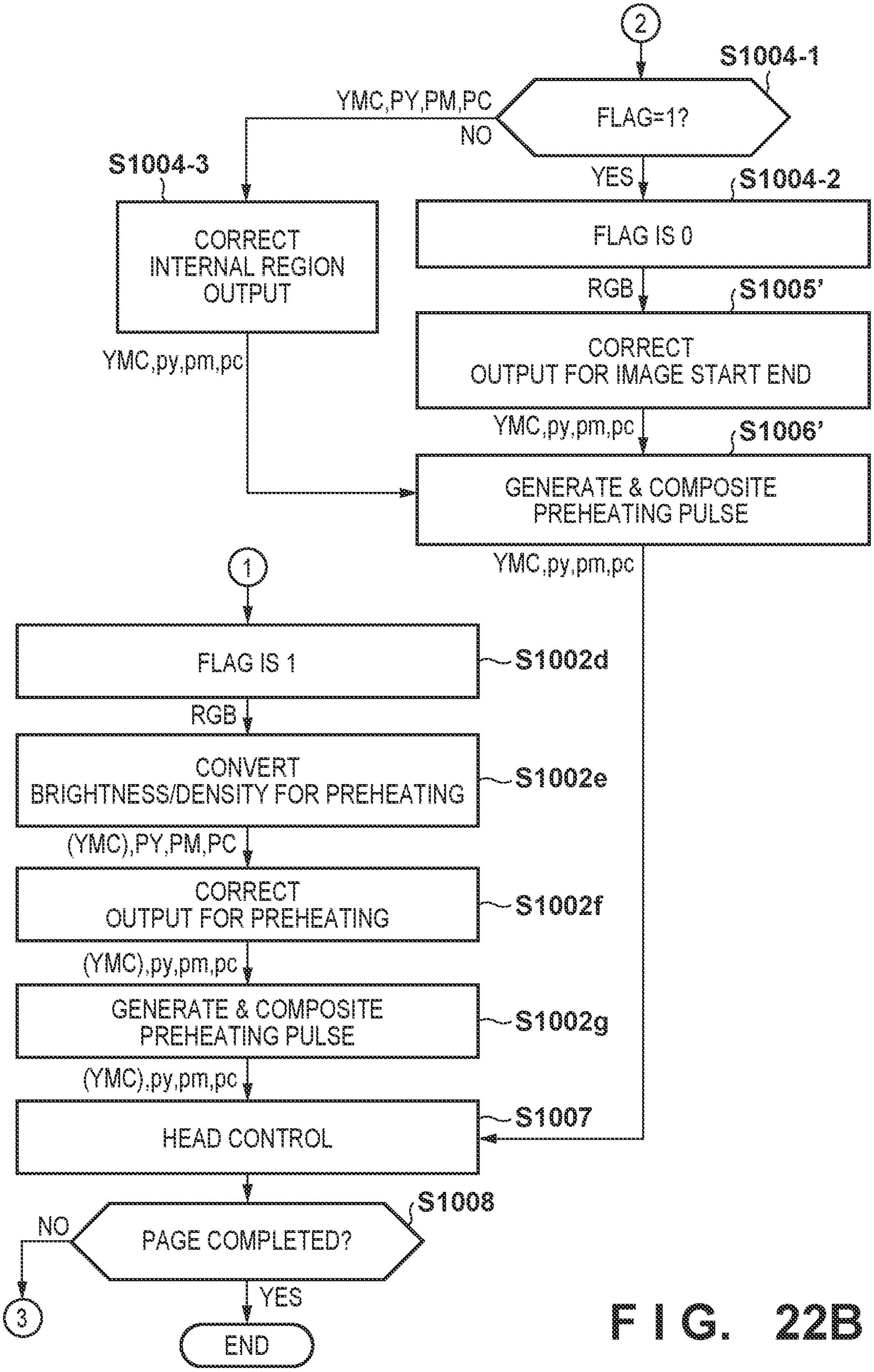
FIG. 22B is a flowchart showing image processing of generating heating pulses and driving the printhead according to Example 3.

FIGS. 22A and 22B are flowcharts showing image processing of generating heating pulses and driving the printhead according to Example 3. These flowcharts show details of print job execution of step S616 in each of FIGS. 6, 8, and 14. Note that in FIGS. 22A and 22B, for the same processing steps as already described with reference to FIG. 10, the same step numbers are added, and a description thereof will be omitted. Only processing steps unique to this example will be described here.

According to FIGS. 22A and 22B, first, in step S1000, the value of a flag (to be described later) is initialized to "0". After that, in step S1001, image data is input. In step S1002, decoding processing is executed if the image data is compressed or encoded. In step S1002-1, it is checked whether a line (nth line) that is being processed in the direction orthogonal to the conveyance direction D is a non-color development region, and the next (n+1)th line is a color development region. Here, if the result is YES, the process advances to step S1002*a*. If the result is NO, the process advances to step S1002-2.

In step S1002*a*, concerning the direction orthogonal to the conveyance direction D, the pixels of the nth line and the (n+1)th line of the image data are input. In step S1002*b*, the same color correction processing as in step S1003 is executed. Furthermore, in step S1002*c*, it is checked whether the pixels of the nth line are specific color data. In this example, the specific color is "white", that is, it is checked whether R=255, G=255, and B=255. Here, if the pixels are white (YES) that is the specific color, the process advances to step S1002*d* to process the pixels of the nth line as the immediately preceding pixel region IW. On the other hand, if the pixels are not the specific color (NO), the process advances to step S1004.

In step S1002*d*, the value of the flag is set to "1". Next, in step S1002*e*, brightness/density conversion for preheating is executed using a three-dimensional lookup table (3D_LUTpre) for preheating. In this process, the pixel values of the (n+1)th line of the image data are input to the 3D_LUTpre, and the density value of each pixel of the nth line that is white data, which corresponds to the preheating pulse, is generated. That is, conversion is executed by $$PY=3D\_LUT\text{pre}[R][G][B][0]$$

$$PM=3D\_LUT\text{pre}[R][G][B][1]$$

$$PC=3D\_LUT\text{pre}[R][G][B][2]$$

Here, PY, PM, and PC represent the density values of Y, M, and C color development of the nth line, which correspond to the preheating pulses for the immediately preceding pixel region IW. The pixels of the nth line correspond to the immediately preceding pixel region IW shown in FIG. 19, and the pixels of the (n+1)th line correspond to the image start end IA.

Here, the above-described 3D_LUTpre is formed by 256×256×256×3=50,331,648 data tables. Each data is density value data corresponding to the width of a pulse applied at each of the application timings p'0 to p'8 in FIGS. 20 and 21. Note that to decrease the data amount of the LUT, the number of grids may be decreased, like the 3D_LUT of Example 1. The application timings p'0 to p'8 of the preheating pulses for the colors are determined in advance to the application timings shown in FIGS. 20 and 21. A preheating pulse width (to be described later) corresponding to a density value decided by the 3D_LUTpre is applied at the predetermined application timing. Also, when a density value corresponding to a preheating pulse width at each of the application timings p'0 to p'8 is set for each application timing in the 3D_LUTpre, both the density value and the application timing corresponding to the preheating pulse width can be decided by the 3D_LUTpre. That is, $$PY=3D\_LUT\text{pre}[R][G][B][0][1][2][3][4][5][6][7][8]$$

$$PM=3D\_LUT\text{pre}[R][G][B][9][10][11][12][13][14][15][16][17]$$

$$PC=3D\_LUT\text{pre}[R][G][B][18][19][20][21][22][23][24][25][26]$$

are calculated.

Here, [0] to [8], [9] to [17], and [18] to [26] each correspond to storage of data of the preheating pulse widths at the application timings p'0 to p'8.

Hence, as shown in FIGS. 20 and 21, the preheating parameters of the colors in the immediately preceding pixel region IW can be independently.

Next, in step S1002*f*, output correction for preheating is executed. More specifically, using a one-dimensional lookup table (1D_LUTpre) for preheating, preheating pulse widths py, pm, and pc are calculated from the density values PY, PM, and PC corresponding to the preheating pulse widths. That is, $$py=1D\_LUT\text{pre}[PY]$$

$$pm=1D\_LUT\text{pre}[PM]$$

$$pc=1D\_LUT\text{pre}[PC]$$

are calculated. In step S1002*g*, preheating pulse generation & composition is executed. Preheating pulses are set for the application timings p'0 to p'8.

In FIG. 20, some of the preheating pulse widths py, pm, and pc may be at the same application timing. However, for one application timing, one preheating pulse width needs to be decided. There are a plurality of deciding methods.

For example, to give priority to preventing color development in the immediately preceding pixel region IW, the minimum value of py, pm, and pc other than 0 at each application timing is set to each application timing. That is, $$p'0=\min(py0,pm0,pc0)$$

$$p'1=\min(py1,pm1,pc1)$$

$$p'2=\min(py2,pm2,pc2)$$

$$p'3=\min(py3,pm3,pc3)$$

$$p'4=\min(py4,pm4,pc4)$$

$$p'5=\min(py5,pm5,pc5)$$

$$p'6=\min(py6,pm6,pc6)$$

$$p'7=\min(py7,pm7,pc7)$$

$$p'8=\min(py8,pm8,pc8)$$

are set. Here, the values (0 to 8) added to py, pm, and pc correspond to the application timings. Note that if all the preheating pulse widths py, pm, and pc are 0, the preheating pulse width is set to 0.

On the other hand, to give priority to raising the preheating temperature, the maximum width of py, pm, and pc at each application timing is set to each application timing. That is, $$p'0=\max(py0,pm0,pc0)$$

$$p'1=\max(py1,pm1,pc1)$$

$$p'2=\max(py2,pm2,pc2)$$

$$p'3=\max(py3,pm3,pc3)$$

$$p'4=\max(py4,pm4,pc4)$$

$$p'5=\max(py5,pm5,pc5)$$

$$p'6=\max(py6,pm6,pc6)$$

$$p'7=\max(py7,pm7,pc7)$$

$$p'8=\max(py8,pm8,pc8)$$

are set. In addition, the balance may be adjusted by the average or the weighted average of py, pm, and pc at each application timing.

Furthermore, in step S1007, head control is executed. That is, the preheating pulse widths at the application timings p'0 to p'8 are controlled, thereby applying the preheating pulses to the immediately preceding pixel region IW and obtaining the preheating effect to the image start end IA.

Then, the process of step S1008 is executed to judge whether to process the continuation of the page or end the processing.

If it is judged, in step S1002-1, that the line (n) under processing is a line in the color development region (NO), the process advances to step S1002-2 to input the pixels of the nth line. From then on, steps S1003 and S1004 described above are executed. That is, the density values of the pixels at the application timings p0 to p8 shown in FIGS. 20, 21, and 23 to be described later are calculated.

In step S1004-1, it is checked whether the value of the flag is "1". Here, if the value of the flag is "1" (YES), the process advances to step S1004-2 to set the value of the flag to "0". Then, the pixels of the nth line are processed as the image start end IA. The process then advances to step S1005'. On the other hand, if the value of the flag is "0" (NO), the process advances to step S1004-3 to process the pixels of the nth line as the internal region IB.

In step S1005', output correction for image start end is executed. More specifically, using a one-dimensional lookup table (1D_LUTpre) for image start end, the preheating pulse widths py, pm, and pc are calculated from the density values PY, PM, and PC corresponding to the preheating pulse widths. The preheating pulse widths to be calculated are preheating widths at the application timings p0 to p8 at the image start end IA shown in FIGS. 20, 21, and 23 to be described later. That is, $$py = 1D\_LUT\text{start}[PY]$$

$$pm = 1D\_LUT\text{start}[PM]$$

$$pc = 1D\_LUT\text{start}[PC]$$

are calculated.

As can be seen from comparison of FIGS. 20 and 21 with FIG. 7, Δt"1 that is the preheating pulse width of py at the application timing p0 is narrower than Δt1 in FIG. 7. This is because at the application timing p'8 in the immediately preceding pixel region IW, the preheating pulse of Δt'1 is applied, and excessive preheating needs to be suppressed.

Figure 23:
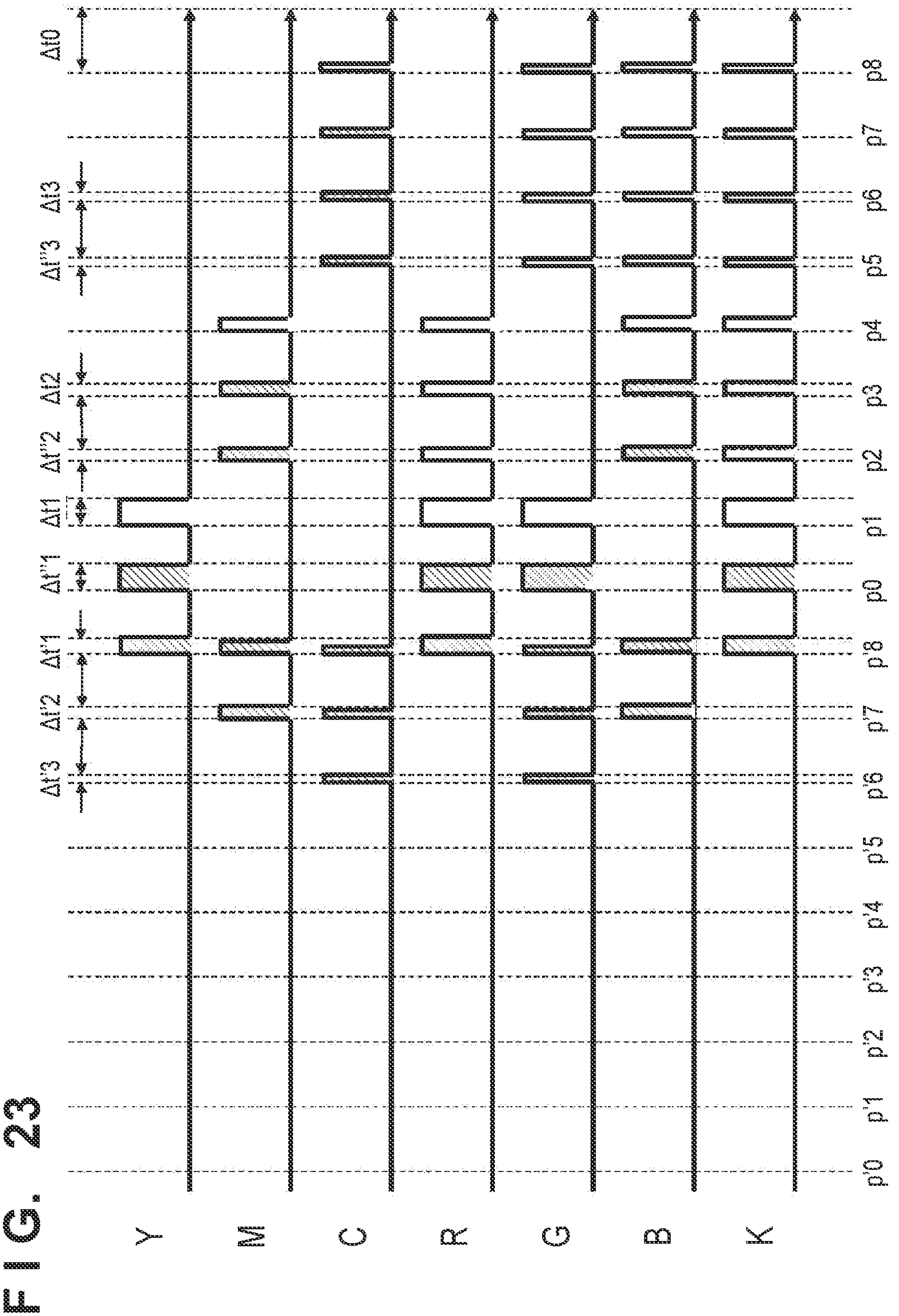
FIG. 23 is a view for explaining the application timings of preheating pulses for the immediately preceding pixel region IW different from FIG. 20.

FIG. 23 is a view for explaining the application timings of preheating pulses for the immediately preceding pixel region IW different from FIG. 20. In FIG. 23, a preheating pulse width Δt" is the same as Δt1 in FIG. 7, and Δt'1 is narrower than in FIGS. 20 and 21. Control of making Δt'1 narrow can be implemented by the 1D_LUTpre in step S1002*f*.

Referring back to FIG. 22B, in step S1006', the same preheating pulse generation & composition as in step S1006 of FIG. 10 is executed. After that, the process advances to step S1007.

On the other hand, in step S1004-3, the pixels of the nth line are defined as the internal region IB, and internal region output correction is executed. This is the same process as step S1005. After that, the process advances to step S1006'.

Hence, according to the above-described example, the difference between the preheating effect for the image start end IA and that for the internal region IB can be reduced, and color development at the image start end IA can be improved.

Note that the 3D_LUTpre used in step S1002*e* generates only preheating pulses, as described above. In Example 5 to be described later, it is changed to a 3D_LUTpre configured to include heating pulses for developing the specific color of the nth line pixels. The configuration is the configuration of the 3D_LUT used in step S1004.

<First Modification>

The heating pulses used at the image start end IA are not limited to the above-described example, and other heating pulses may be used.

Figure 24:
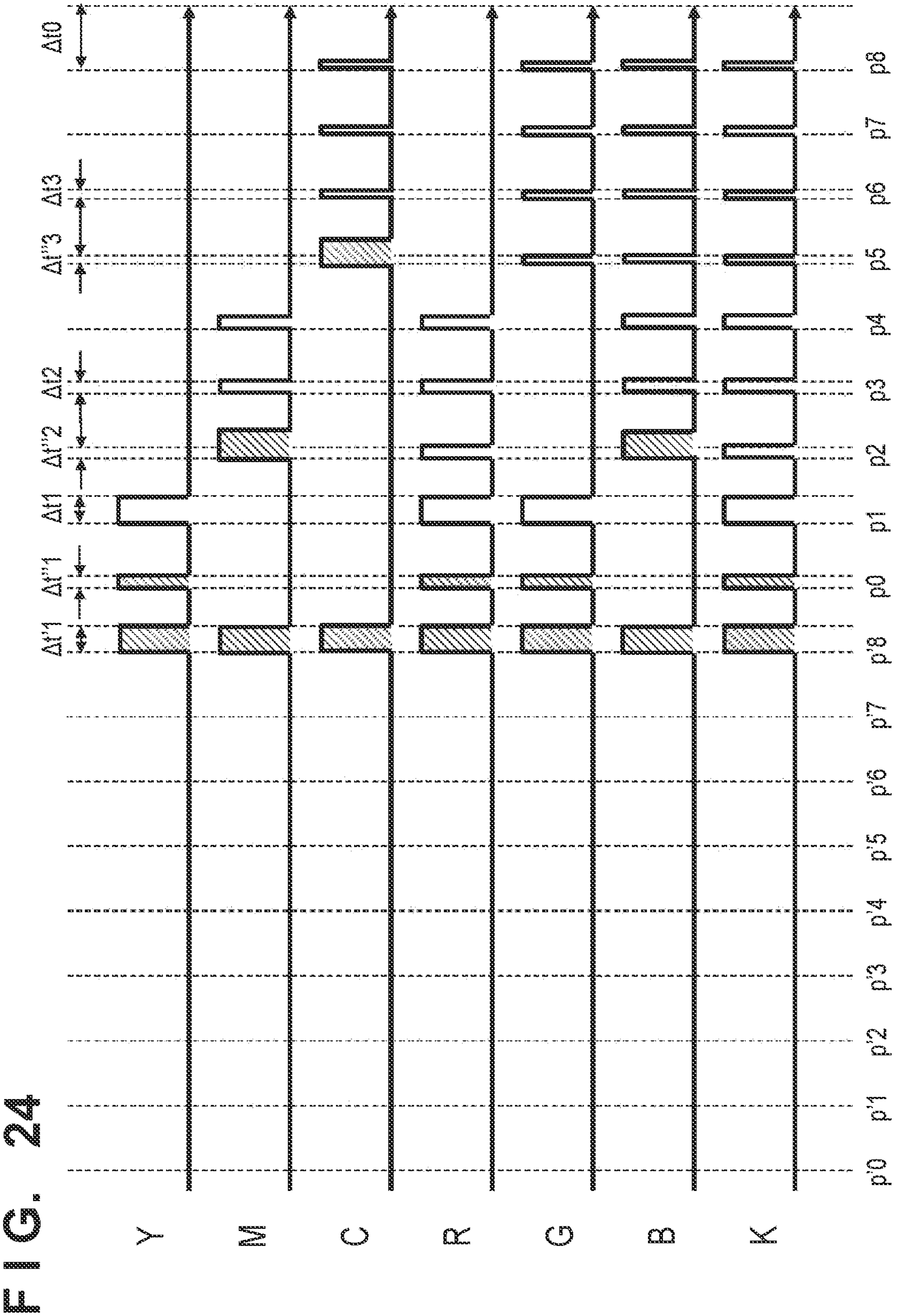
FIG. 24 is a view showing an example in which heating pulses based on the heating pulses shown in FIG. 9 are used for the application timings at an image start end.

FIG. 24 is a view showing an example in which heating pulses based on the heating pulses shown in FIG. 9 are used for the application timings p0 to p8 at the image start end IA.

When the flowcharts shown in FIGS. 22A and 22B are applied in high color development print job execution in step S615A of FIG. 8, heating pulses at the application timings p'0 to p'8 in the immediately preceding pixel region IW and at the application timings p0 to p8 at the image start end IA shown in FIG. 24 can be generated. Heating pulses at the application timings p0 to p8 in the internal region IB can also be generated. Note that the contents of the 3D_LUTpre and the 1D_LUTpre for the immediately preceding pixel region IW are changed such that the preheating pulse widths shown in FIG. 24 are included.

The contents of the 3D_LUT for the image start end IA and the internal region IB are the same as the heating pulses shown in FIG. 9. In addition, the contents of the 1D_LUTpre for the image start end IA are changed such that the preheating pulse widths shown in FIG. 24 are included. The 1D_LUT for the internal region IB is the same as the heating pulses shown in FIG. 9. As for the widths of Δt'1 and Δt"1 shown in FIG. 24, control is performed to make Δt"1 narrow. However, control may be performed to make Δt'1 narrow, as shown in FIG. 23.

Hence, by the above-described configuration, even in the high color development print job, the difference between the preheating effect for the image start end IA and the preheating effect for the internal region IB can be reduced, and color development at the image start end IA can be improved.

Also, even for heating pulses having the configurations shown in FIGS. 11 to 13, if the above-described FIG. 9 is applied, as in FIG. 24, the color development at the image start end IA can be improved.

<Second Modification>

The heating pulses used at the image start end IA are not limited to the above-described example, and other heating pulses may be used.

Figure 25:
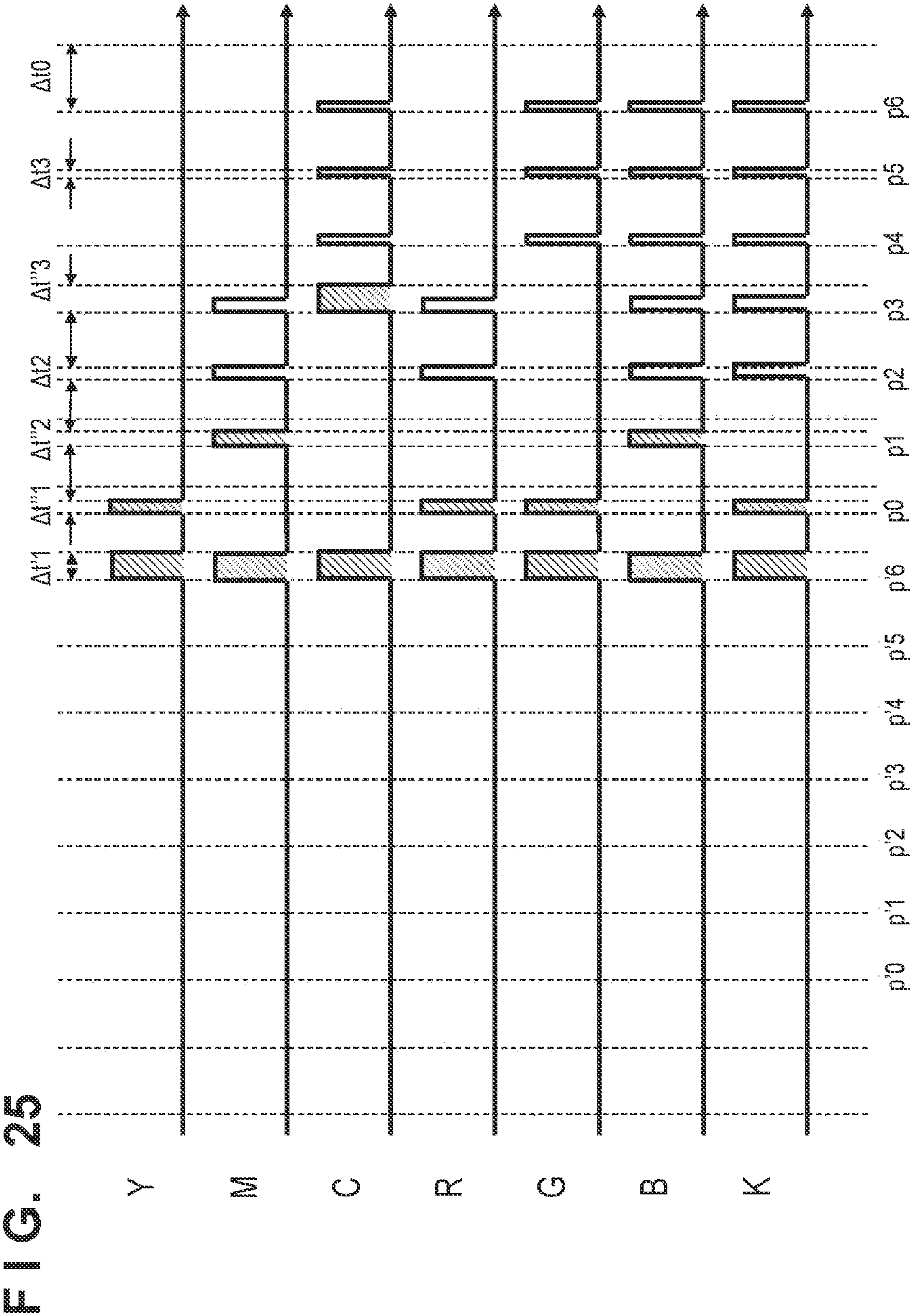
FIG. 25 is a view showing an example in which heating pulses based on the heating pulses shown in FIG. 15 are used for the application timings at an image start end.

FIG. 25 is a view showing an example in which heating pulses based on the heating pulses shown in FIG. 15 are used for the application timings p0 to p8 at the image start end IA.

When the flowcharts shown in FIGS. 22A and 22B are applied in high-speed print job execution in step S615" of FIG. 14, heating pulses at the application timings p'0 to p'6 in the immediately preceding pixel region IW and at the application timings p0 to p6 at the image start end IA shown in FIG. 25 can be generated. Heating pulses at the application timings p0 to p6 in the internal region IB can also be generated. Note that the contents of the 3D_LUTpre and the 1D_LUTpre for the immediately preceding pixel region IW are changed such that the preheating pulse widths shown in FIG. 25 are included.

The contents of the 3D_LUT for the image start end IA and the internal region IB are the same as the heating pulses shown in FIG. 15. In addition, the contents of the 1D_LUTpre for the image start end IA are changed such that the preheating pulse widths shown in FIG. 25 are included. The 1D_LUT for the internal region IB is the same as the heating pulses shown in FIG. 15. As for the widths of Δt'1 and Δt"1 shown in FIG. 25, control is performed to make Δt"1 narrow. However, control may be performed to make Δt'1 narrow, as shown in FIG. 23.

Hence, by the above-described configuration, even in the high-speed print job, the difference between the preheating effect for the image start end IA and the preheating effect for the internal region IB can be reduced, and color development at the image start end IA can be improved.

Also, even for heating pulses having the configurations shown in FIGS. 16 to 18, the above-described FIG. 15 is applied, as in FIG. 25, the color development at the image start end IA can be improved.

Example 4

In Example 3, an example in which the improvement of color development at the image start end IA in the conveyance direction of the print medium (infrared image member) 10 shown in FIG. 19 is implemented by generating the preheating pulses for the immediately preceding pixel region IW by referring to the pixel values at the image start end IA has been described. In Example 4, an example in which preheating pulses are generated by correcting the pixel values in the immediately preceding pixel region IW in accordance with the pixel values at the image start end IA will be described.

FIG. 26 is a view for explaining a correction table that stores the pixel values in the immediately preceding pixel region IW, which are corrected in accordance with the pixel values at the image start end IA if the immediately preceding pixel region IW includes white pixels.

This correction table stores the corrected pixel values of R, B, and B in the immediately preceding pixel region IW for the combinations of the 256 tones of R, G, and B at the image start end IA. If the immediately preceding pixel region IW includes white pixels, corrected pixel values in the immediately preceding pixel region IW can be calculated by the pixel values at the image start end IA and the correction table shown in FIG. 26. For example, for Y, M, C, R, G, B, and K, the pixel values can be calculated as follows.

| | Pixel values at image start end IA | | | Corrected values in immediately preceding pixel region IW | | |
|---|---|---|---|---|---|---|
| Colors | R | G | B | R | G | B |
| Y | 255 | 255 | 0 | 255 | 255 | 240 |
| M | 255 | 0 | 255 | 255 | 196 | 255 |
| C | 0 | 255 | 255 | 128 | 255 | 255 |
| R | 255 | 0 | 0 | 255 | 240 | 240 |
| G | 0 | 255 | 0 | 128 | 255 | 128 |
| B | 0 | 0 | 255 | 196 | 196 | 255 |
| K | 0 | 0 | 0 | 240 | 240 | 240 |

For the immediately preceding pixel region IW, the corrected values are used, and heating pulses are generated by the same method as for the image start end IA and an internal region IB. Note that it is preferable that the heating pulses generated by the corrected values in the immediately preceding pixel region IW do not cause visually recognizable color development in the immediately preceding pixel region IW, and provide the preheating effect for the colors at the next image start end IA. More specifically, the pixel values preferably have the same hue as the pixel values at the image start end IA and hardly reach color development visually recognized at the distal end of the image. As shown in FIG. 26, pixel values whose brightness is higher than that at the image start end IA are set to the corrected pixel values in the immediately preceding pixel region IW.

Figure 27:
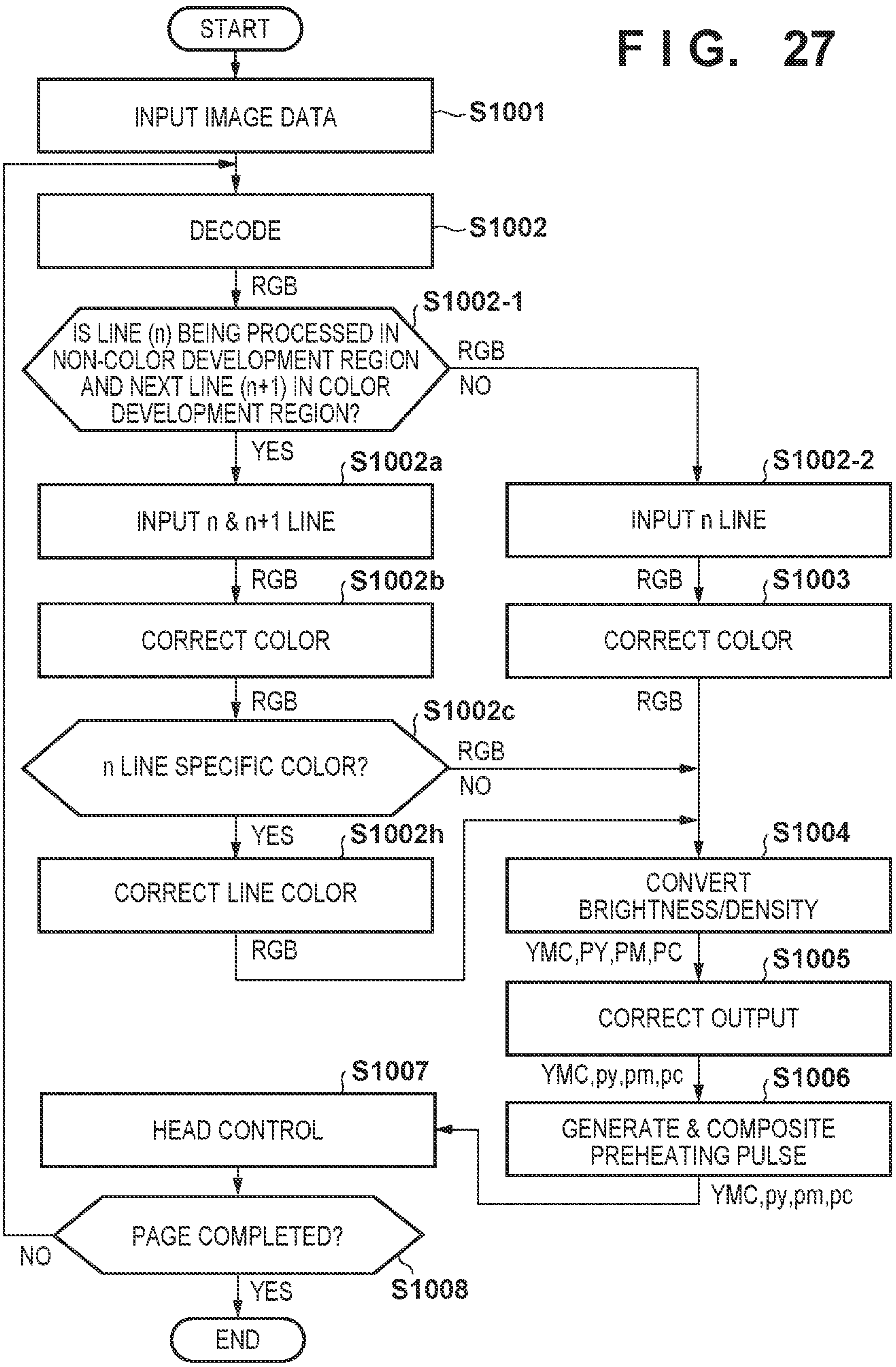
FIG. 27 is a flowchart showing image processing of generating heating pulses and driving the printhead according to Example 4.

FIG. 27 is a flowchart showing image processing of generating heating pulses and driving the printhead according to Example 4. This flowchart shows details of print job execution of step S616 in each of FIGS. 6, 8, and 14. Note that in FIG. 27, for the same processing steps as already described with reference to FIG. 10 and FIGS. 22A and 22B, the same step numbers are added, and a description thereof will be omitted. Only processing steps unique to this example will be described here.

According to FIG. 27, after steps S1001 and S1002 are executed, if it is judged, in step S1002-1, that a line (nth line) currently under processing is a non-color development region, and the next (n+1)th line is a color development region, the process advances to step S1002*a*. Then, steps S1002*a* to S1002*c* are executed. If it is determined, in step S1002*c*, that the pixels of the nth line are specific color data, in this example, "white", that is, R=255, G=255, and B=255 (YES), the process advances to step S1002*h*. On the other hand, if the pixels do not have the specific color (NO), the process advances to step S1004.

In step S1002*h*, the nth line pixels are processed as the immediately preceding pixel region IW. More specifically, using the correction table described with reference to FIG. 26, the pixel values of the nth line corresponding to the immediately preceding pixel region IW are corrected using the (n+1)th line pixel values corresponding to the image start end IA. After that, the process advances to step S1004.

After brightness/density conversion is executed in step S1004, output correction in step S1005 is executed, and preheating pulse generation & composition in step S1006 is executed.

After that, the processes of steps S1007 and S1008 are executed.

Comparing the above-described example with FIGS. 22A and 22B, in this example, the processes of brightness/density conversion, output correction, and preheating pulse generation & composition corresponding to steps S1004 to S1006 can be made common independently of the previous determination result. Hence, the table to be looked up in steps S1004 to S1006 can also be made common independently of the determination result.

Hence, according to the above-described example, the difference between the preheating effect for the image start end IA and the preheating effect for the internal region IB can be reduced, and color development at the image start end IA can be improved.

Example 5

In Examples 3 and 4, an example in which if the immediately preceding pixel region IW is white data, the preheating pulses are applied such that the preheating effect is obtained for the image start end IA has been described. In Example 5, an example in which preheating pulses are applied to an image start end IA in accordance with the combination of the specific colors of an immediately preceding pixel region IW and the image start end IA, including the immediately preceding pixel region IW that is white data will be described.

FIG. 28 is a view showing preheating instructions according to the combination of specific colors of the immediately preceding pixel region IW and the image start end IA and the numbers of table groups to be used. Note that to execute this example, the already described flowcharts shown in FIGS. 22A and 22B can be used.

In step S1002*c* of FIG. 22A, the table shown in FIG. 28 is looked up. For example, if the pixels of the nth line have R=255, G=255, B=0, and the pixels of the (n+1)th line have R=0, G=255, and B=255, the preheating instruction is "preheat". Hence, it is determined that the color is the specific color (YES), and the process advances to step S1002*d*. Also, in step S1002*e*, as described in Example 1, a 3D_LUT capable of storing preheating pulses for developing the specific color is used as a 3D_LUTpre. The 3D_LUT also includes preheating pulses for the image start end IA.

When a number for identifying a table group is decided in advance for each specific color combination, in addition to the 1D_LUTpre used in step S1002*f*, and managed in the table shown in FIG. 28, an appropriate table group can be set by looking up the table. If the pixels of the nth line have R=255, G=255, and B=0 (that is, Y color), and the pixels of the (n+1)th line have R=0, G=255, and B=255 (that is, C color), the table group number is 12, and tables corresponding to this number are set for each process.

Figure 29:
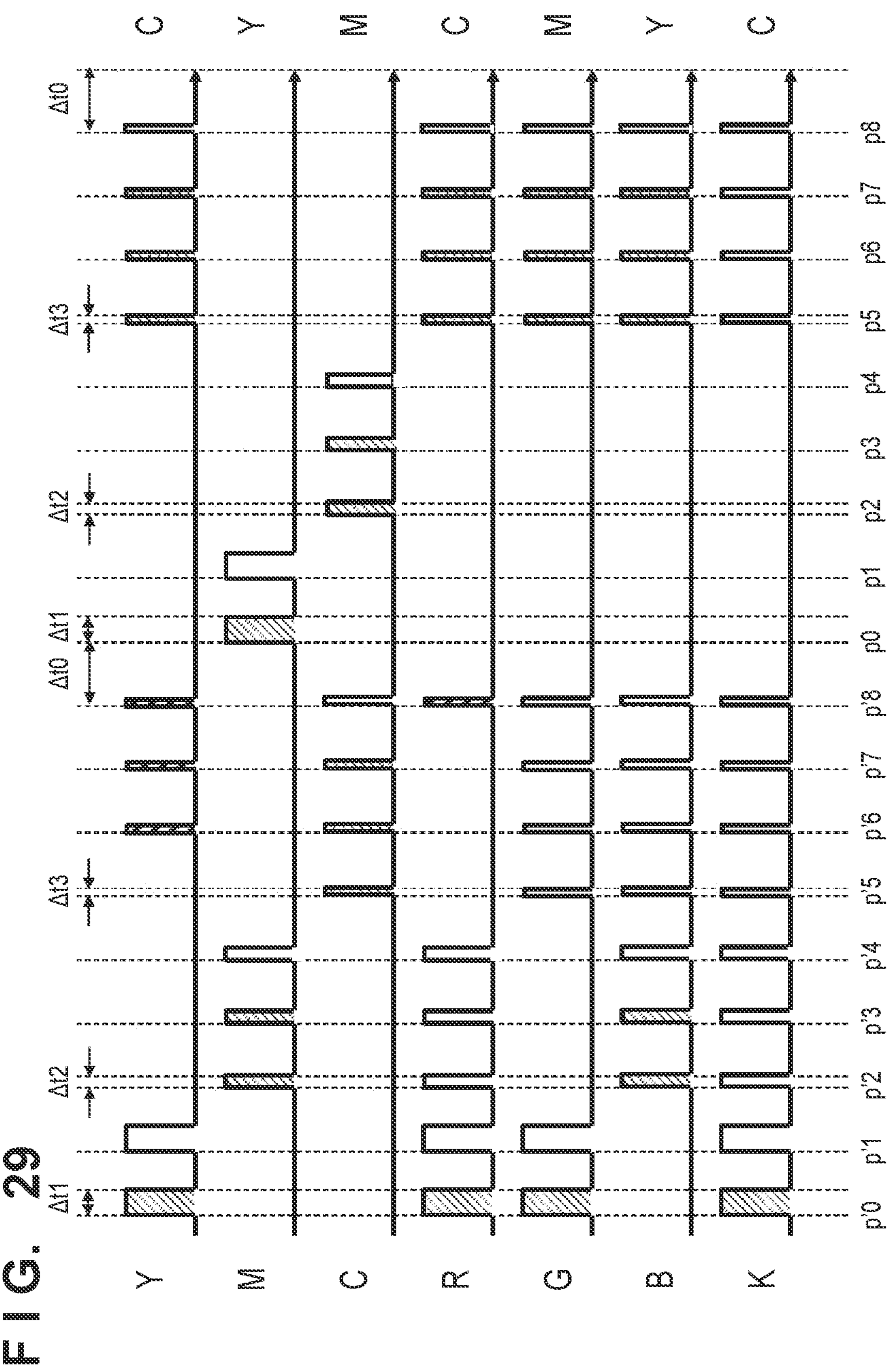
FIG. 29 is a view for explaining heating pulses for the combination of specific colors of the pixels of an nth line and the pixels of an (n+1)th line.

FIG. 29 is a view for explaining heating pulses for the combination of specific colors of the pixels of the nth line and the pixels of the (n+1)th line. In FIG. 29, colors shown at the left end represent the print colors of the pixels of the nth line, and colors shown at the right end represent the print colors of the pixels of the (n+1)th line.

Consider the time after heating pulses are applied at application timings p'0 and p'1 for R=255, G=255, and B=0 (Y color) of the nth line pixels shown in FIG. 29 until a heating pulse is applied at an application timing p5 for R=0, G=255, and B=255 (C color) of the (n+1)th line pixels. In this case, since the elapsed time is long, preheating of an image forming layer 18 of C is insufficient. Hence, in the table of table group number 12 shown in FIG. 28, values capable of generating preheating pulses for the (n+1)th line pixels are set at application timings p'6, p'7, and p'8 for the nth line pixels. Also, in a case where the print color of the nth line pixels is R, and the color of the (n+1)th line pixels is C as well, since the time from the application timing p'4 to p5 is long, a preheating pulse for the (n+1)th line is set at the application timing p'8.

On the other hand, if the preheating effect for color development of the (n+1)th line pixels is sufficiently obtained by color development of the nth line pixels, the preheating pulses for the (n+1)th line pixels need not be set for the nth line pixels. For example, as shown in FIG. 29, in a case where the nth line pixels are K, and the (n+1)th line pixels are C, since preheating for the (n+1)th line pixels is sufficiently performed by heating for developing the color of the nth line pixels, preheating pulses need not be set.

If the nth line pixels have R=0, G=0, and B=0, and the (n+1)th line pixels have R=0, G=255, and B=255, the preheating instruction is “not preheat” according to the table shown in FIG. 28. Hence, it is determined, in step S1002*c* of FIG. 22A, that the color is not the specific color (NO), the process advances to step S1004.

In FIG. 22B, a table is used in steps S1005', S1006', and S1004-3. The processing is executed using a table corresponding to the table group number corresponding to the set of the nth line pixels and the (n+1)th line pixels.

Hence, according to the above-described example, the difference between the preheating effect for the image start end IA and the preheating effect for an internal region IB can be reduced, and color development at the image start end IA can be improved.

Note that in the above description, an example in which the processing of the flowcharts shown in FIGS. 22A and 22B is applied has been described. The processing of this example can be executed by applying the processing of the flowchart shown in FIG. 27.

That is, in step S1002*c* shown in FIG. 27, the table shown in FIG. 28 is looked up. For example, if the nth line pixels have R=255, G=255, and B=0, and the (n+1)th line pixels have R=0, G=255, and B=255, the preheating instruction is “preheat”. Hence, it is determined that the color is the specific color (YES), the process advances to step S1002*h*. Also, if the nth line pixels have R=0, G=0, and B=0, and the (n+1)th line pixels have R=0, G=255, and B=255, the preheating instruction is “not preheat”. Hence, it is determined that the color is not the specific color (NO), and the process advances to step S1004.

Note that when applying the flowchart shown in FIG. 27, the table group number is set such that the table used in step S1002*h* can be set in accordance with the combination of specific colors.

Example 6

In Examples 3 to 5, an example in which the preheating pulses for the immediately preceding pixel region IW, which are set and applied, are set has been described. In Example 6, an example in which the widths or application timings of preheating pulses for an immediately preceding pixel region IW are changed depending on a heat history will be described. The preheating pulse widths or the application timings are changed depending on the heat history to reduce excess/deficiency of the preheating effect. The heat history is the history of the estimated temperature of each layer in the immediately preceding pixel region IW of an infrared image member 10 based on the peripheral temperature of the infrared image member 10 detected by a thermistor or the pattern of heating pulses applied before the immediately preceding pixel region IW.

Based on the activation temperatures of an image forming layer 14, an image forming layer 16, and an image forming layer 18 of the infrared image member 10, which are known in advance, and colors developed by printing various images in experiments, the temperature of each image forming layer corresponding to each developed color can be estimated. In addition, the temperature of a thermistor (not shown) provided in a printing apparatus 40 at the time of color development in each printing is recorded, and the correspondence relationship between the temperature of the thermistor and the estimated temperature of each image forming layer is stored in a table. Alternatively, the correspondence relationship between the pattern of heating pulses for the developed color in the experiments and the estimated temperature of each image forming layer may be stored in a table.

At the time of print job execution in step S616, high color development print job execution in step S615A, and high-speed print job execution in step S615", the temperature of the immediately preceding pixel region IW can be estimated from the temperature of the thermistor of the pattern of heating pulses by looking up the above-described table.

In this example, depending on the estimated temperature, the preheating pulse widths at application timings p'0 to p'8 and the application timings in FIGS. 20, 21, and 23 are changed. More specifically, a plurality of 3D_LUTpre capable of calculating both the preheating pulse width and the application timing described in Example 3 are prepared in advance in accordance with the temperature, and a 3D_LUTpre corresponding to the estimated temperature is selected. The preheating pulse widths at the application timings p'0 to p'8 and the application timings can be changed in this way.

In this change, control is performed such that the higher the temperature is, the narrower the preheating pulse width is, or the smaller the number of application timings is.

Figure 30:
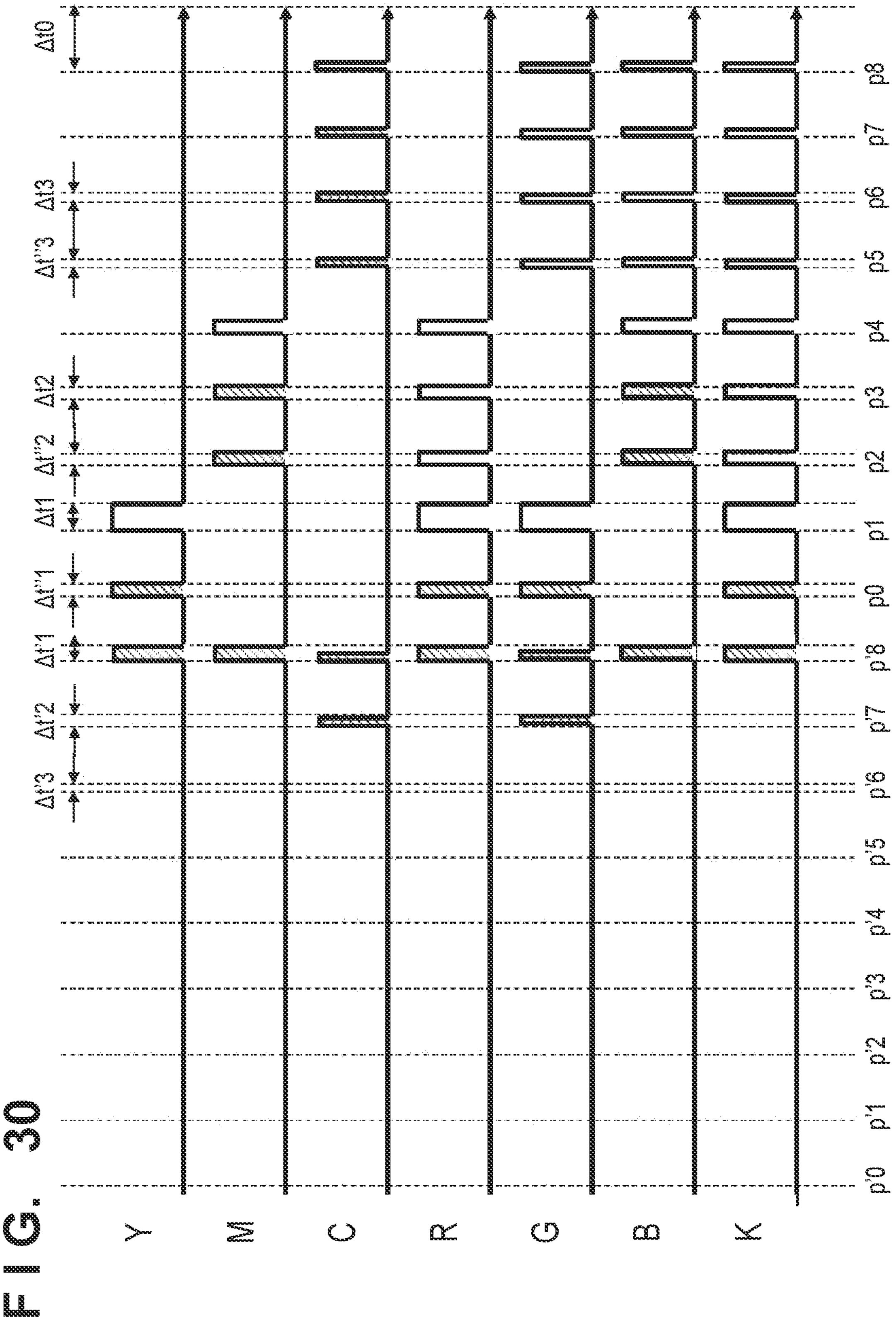
FIG. 30 is a view showing an example of preheating pulses in a case where the heat history indicates a high temperature and following heating pulses.

FIG. 30 is a view showing an example of preheating pulses in a case where the heat history indicates a high temperature and following heating pulses. On the other hand, FIG. 20 shows the preheating pulse widths for the nth line pixels in a case where the heat history indicates room temperature.

As can be seen from comparison between FIGS. 30 and 20, if the color is Y, R, or K, a preheating pulse width Δt'1 at the application timing p'8 is narrower in FIG. 30 than in FIG. 20. If the color is M or B, no preheating pulse is applied at the application timing p'7 in FIG. 30. If the color is C or G, no preheating pulse is applied at the application timing p'6 in FIG. 30. The description has been made here based on the two patterns shown in FIGS. 20 and 30. Three or more patterns with different preheating pulse widths or numbers of application timings may selectively be used in accordance with the heat history. In addition, preheating pulse widths and application timings, which do not cause color development in the immediately preceding pixel region IW and provide the preheating effect for an image start end IA, are preferably set in advance in the 3D_LUTpre in accordance with the temperature.

Hence, according to the above-described example, the difference between the preheating effect for the image start end IA and the preheating effect for an internal region IB can be reduced in accordance with the heat history, and color development at the image start end IA can be improved.

OTHER EXAMPLES

Examples 3 to 6 have been described using an example in which preheating pulses are included in heating pulses for the image start end IA, like the internal region IB. However, the present invention is not limited to this configuration. For example, preheating for the image start end IA may be executed using only preheating pulses for the immediately preceding pixel region IW.

Figure 31:
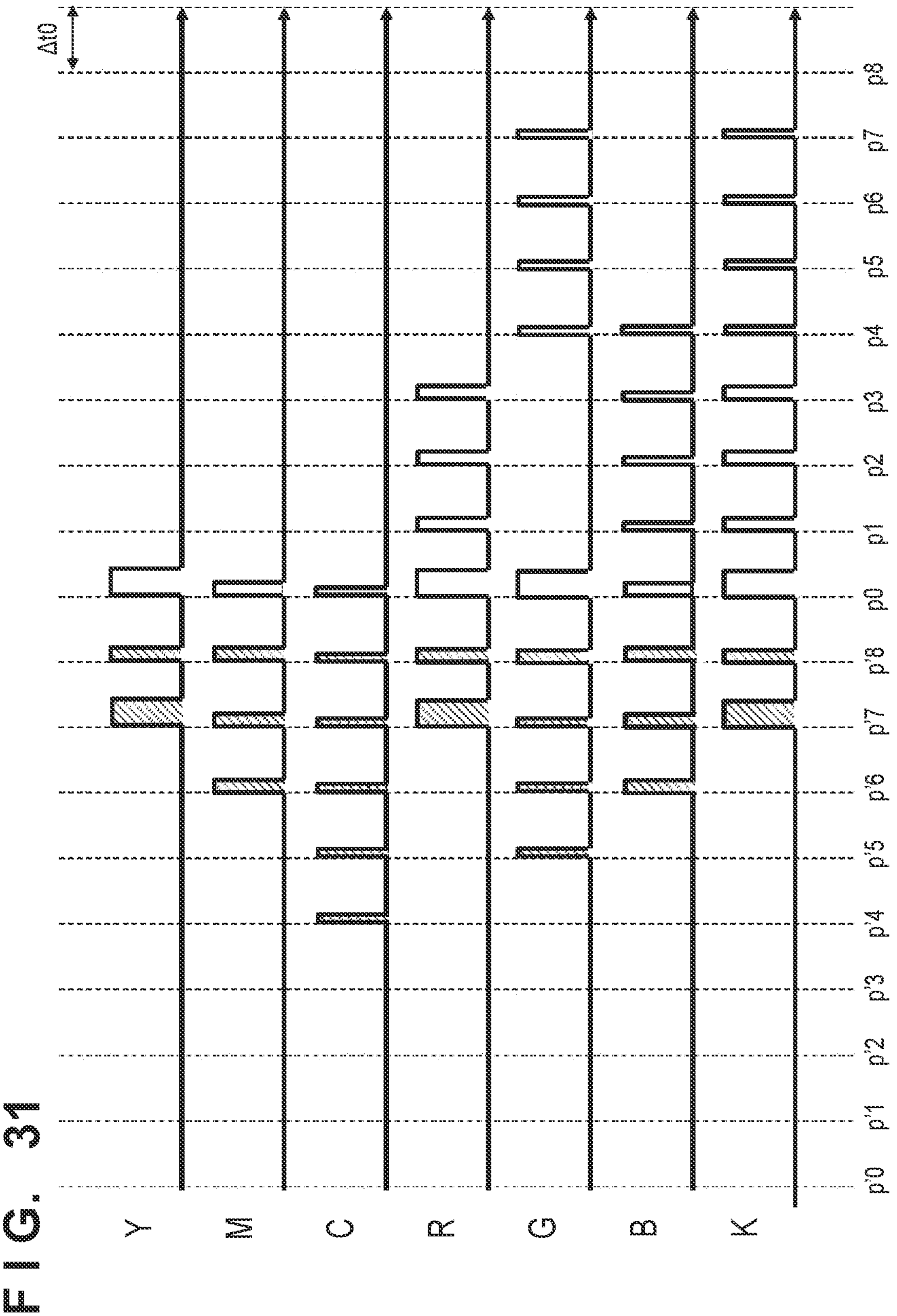
FIG. 31 is a view showing an example in which preheating for the image start end is executed using only preheating pulses for the immediately preceding pixel region.

FIG. 31 is a view showing an example in which preheating for the image start end IA is executed using only preheating pulses for the immediately preceding pixel region IW.

Features of the preheating pulses shown in FIG. 31 will be described below in comparison with FIG. 20.

In the case of Y, when the preheating pulse for the immediately preceding pixel region IW and the pulse for the image start end IA shown in FIG. 20 are applied earlier only by Δt0, only an image formation pulse is applied for the image start end IA, as shown in FIG. 31.

In the case of M, when the preheating pulse for the immediately preceding pixel region IW shown in FIG. 20 is applied earlier only by Δt0, and the pulse for the image start end IA is applied earlier only by Δt0×2, only an image formation pulse is applied for the image start end IA, as shown in FIG. 31. The reason why the number of preheating pulses is decreased from 4 to 3 is that the preheating pulses can be applied at continuous application timings, unlike FIG. 20, and therefore, the preheating effect is high, and if the number of preheating pulses remains 4, M is developed in the immediately preceding pixel region IW.

In the case of C, when the preheating pulse for the immediately preceding pixel region IW shown in FIG. 20 is applied earlier only by Δt0×2, and the pulse for the image start end IA is applied earlier only by Δt0×8, only an image formation pulse is applied for the image start end IA, as shown in FIG. 31. The reason why the number of preheating pulses is decreased from 6 to 5 is that the preheating pulses can be applied at continuous application timings, unlike FIG. 20, and therefore, the preheating effect is high, and if the number of preheating pulses remains 6, C is developed in the immediately preceding pixel region IW.

In the case of R, when the preheating pulse for the immediately preceding pixel region IW shown in FIG. 20 and the pulse for the image start end IA are applied earlier only by Δt0, only image formation pulses are applied for the image start end IA, as shown in FIG. 31.

In the case of G, when the preheating pulse for the immediately preceding pixel region IW shown in FIG. 20 and the pulse for the image start end IA are applied earlier only by MO, only image formation pulses are applied for the image start end IA, as shown in FIG. 31.

In the case of B, when the preheating pulse for the immediately preceding pixel region IW shown in FIG. 20 is applied earlier only by Δt0, and the pulse for the image start end IA is applied earlier only by Δt0×2, only image formation pulses are applied for the image start end IA, as shown in FIG. 31. The reason why the number of preheating pulses is decreased from 4 to 3 is that the preheating pulses can be applied at continuous application timings, unlike FIG. 20, and therefore, the preheating effect is high, and if the number of preheating pulses remains 4, M is developed in the immediately preceding pixel region IW.

In the case of K, when the preheating pulse for the immediately preceding pixel region IW shown in FIG. 20 and the pulse for the image start end IA are applied earlier only by Δt0, only image formation pulses are applied for the image start end IA, as shown in FIG. 31.

As described above, even when the pulses are applied at the timings shown in FIG. 31, color development at the image start end IA can be improved.

As described above, when the heating pulses for preheating are set in accordance with the combination of tristimulus values such as RGB or CMY, the color development efficiency can be improved. The improvement of the color development efficiency can be used to implement high color development or high-speed printing.

Note that to determine the necessity of the heating pulses for preheating based on the combination of tristimulus values by simple processing, it is determined whether Y=0 or not (whether B=255 or not), and if the determination result is YES, heating pulses for preheating may be used.

This is because in the infrared image member 10, the Y color development layer is provided closest to the surface of the member and has the highest color development temperature, and therefore, has the preheating effect for the development of other colors. If, in the infrared image member 10, the layer of another color, for example, the M color development layer is provided closest to the surface of the member and has the highest color development temperature, it is appropriate to determine whether M=0 or not (whether G=255 or not), as a matter of course.

Also, in the above-described embodiment, a form in which the printing apparatus and the host apparatus are separated has been described. However, the host apparatus serving as a supply source for supplying image data can be an image capturing device such as a digital camera. In this case, an apparatus that integrates a printing apparatus and a digital camera, that is, a so-called printing apparatus with an image capturing function is also incorporated in the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A printing apparatus configured to heat a sheet-shaped print medium in which a plurality of color development layers that develop colors in accordance with heating are stacked in correspondence with a plurality of colors so as to form an image on the print medium by causing a desired color development layer in the plurality of color development layers to independently develop the color, the apparatus comprising:

an input unit configured to receive image data from a host apparatus;

a printhead including a plurality of heating elements;

a drive unit configured to drive each of the plurality of heating elements of the printhead using a first pulse for preheating a predetermined color development layer, and a second pulse applied after the first pulse to cause the predetermined color development layer to develop the color; and a pulse control unit configured to, when developing a specific color, perform a control in which a pulse width of the first pulse is increased and/or a control in which the number of times of application of the second pulse is increased such that another color development layer that is not used to reproduce the specific color does not develop the color, wherein in the print medium, a first color development layer configured to develop yellow (Y), a second color development layer configured to develop magenta (M), and a third color development layer configured to develop cyan (C) are formed sequentially from a side where the plurality of heating elements of the printhead contact, the drive unit drives the printhead based on the image data received by the input unit to cause the first color development layer, the second color development layer, and the third color development layer to develop the colors in this order, thereby forming the image on the print medium, and the specific color is a color formed by color development of only the second color development layer, color development of only the third color development layer, and color development by the second color development layer and the third color development layer.

2. The printing apparatus according to claim 1, wherein the input unit further receives an instruction representing whether to perform high color development, and if the instruction of high color development exists, control by the pulse control unit is performed.

3. The printing apparatus according to claim 2, wherein the pulse control unit performs, when causing the second color development layer or the third color development layer alone to develop the color, a control in which the pulse width of the first pulse used to preheat the color development layer to be caused to develop the color is increased, and when causing the second color development layer and the third color development layer to develop the colors, a control in which the pulse width of the first pulse used to preheat the second color development layer is increased.

4. The printing apparatus according to claim 1, wherein the pulse control unit performs, when causing the second color development layer or the third color development layer alone to develop the color, a control in which the pulse width of the first pulse used to preheat the color development layer to be caused to develop the color is increased, and when causing the second color development layer and the third color development layer to develop the colors, a control in which the pulse width of the first pulse used to preheat the second color development layer is increased.

5. The printing apparatus according to claim 1, wherein independently of the color development layer to be caused to develop the color, the pulse control unit performs a control in which the pulse width of the first pulse is increased such that other color development layers are preheated at the same timing and in the same pulse width as preheating the color development layer to be caused to develop the color at an early timing.

6. The printing apparatus according to claim 1, wherein independently of the color development layer to be caused to develop the color, the pulse control unit controls an application timing of the first pulse such that other color development layers are preheated at the same timing as preheating the color development layer to be caused to develop the color at an early timing, and performs a control in which the application timing of the first pulse for preheating the color development layer to be caused to develop the color matches at least an application timing of the second pulse used for color development of another color development layer different from the color development layer.

7. The printing apparatus according to claim 1, wherein the input unit further receives an instruction representing whether to perform high-speed printing, and when the instruction of high-speed printing exists, control by the pulse control unit is performed.

8. The printing apparatus according to claim 1, wherein the pulse control unit performs when causing the second color development layer or the third color development layer alone to develop the color, a control in which the pulse width of the first pulse used to preheat the color development layer to be caused to develop the color is increased, and the first pulse with the increased pulse width is applied once immediately before the second pulse is applied for color development of the color development layer to be caused to develop the color, and when causing the second color development layer and the third color development layer to develop the colors, a control in which the pulse width of the first pulse used to preheat the second color development layer is increased, and the first pulse with the increased pulse width is applied once immediately before the second pulse is applied for color development of the second color development layer.

9. The printing apparatus according to claim 1, wherein independently of the color development layer to be caused to develop the color, the pulse control unit performs a control in which the pulse width of the first pulse is increased such that other color development layers are preheated at the same timing and in the same pulse width as preheating the color development layer to be caused to develop the color at an early timing, and the first pulse with the increased pulse width is applied once.

10. The printing apparatus according to claim 1, wherein the pulse control unit performs a control in which an application timing of the first pulse for preheating the color development layer to be caused to develop the color matches at least the second pulse used for color development of another color development layer different from the color development layer.

11. The printing apparatus according to claim 1, wherein independently of the color development layer to be caused to develop the color, the pulse control unit controls an application timing of the first pulse such that other color development layers are preheated at the same timing as preheating the color development layer to be caused to develop the color at an early timing, and performs a control in which the application timing of the first pulse for preheating the color development layer to be caused to develop the color matches at least an application timing of the second pulse used for color development of another color development layer different from the color development layer.

12. The printing apparatus according to claim 1, wherein the host apparatus configured to output the image data is included in the printing apparatus.

13. The printing apparatus according to claim 1, wherein the pulse control unit applies the first pulse and the second pulse to the same pixel.

14. A printing apparatus configured to heat a sheet-shaped print medium in which a plurality of color development layers that develop colors in accordance with heating are stacked in correspondence with a plurality of colors so as to form an image on the print medium by causing a desired color development layer in the plurality of color development layers to independently develop the color, the apparatus comprising:

a printhead including a plurality of heating elements;

a drive unit configured to drive each of the plurality of heating elements of the printhead using a first pulse for preheating a predetermined color development layer, and a second pulse applied after the first pulse to cause the predetermined color development layer to develop the color; and a pulse control unit configured to, when developing a specific color, perform a control in which a pulse width of the first pulse is increased and/or a control in which the number of times of application of the second pulse is increased such that another color development layer that is not used to reproduce the specific color does not develop the color, wherein the pulse control unit performs a control in which an application timing of the first pulse for preheating the color development layer to be caused to develop the color matches at least an application timing of the second pulse used for color development of another color development layer different from the color development layer.

15. A printing apparatus configured to heat a sheet-shaped print medium in which a plurality of color development layers that develop colors in accordance with heating are stacked in correspondence with a plurality of colors so as to form an image on the print medium by causing a desired color development layer of the plurality of color development layers to develop the color, comprising:

a printhead including a plurality of heating elements;

a drive unit configured to drive each of the plurality of heating elements of the printhead using a first pulse for preheating a predetermined color development layer, and a second pulse applied after the first pulse to cause the predetermined color development layer to develop the color;

a conveyance unit configured to convey the print medium in a first direction with respect to the printhead; and a control unit configured to perform a control in which the drive unit uses the first pulse in a first pixel that is located in an image non-forming region of the print medium, and the drive unit uses the second pulse in a second pixel that is located in an image forming region of the print medium and is to be printed after the first pixel, wherein in a case where the color development layer to be caused to develop the color at a position of the second pixel is a first color development layer and in a case where the color development layer to be caused to develop the color is a second color development layer different from the first color development layer, the control unit performs, based on image data, changing a duty ratio of the first pulse used at a position of the first pixel and/or changing an application time of the first pulse.

16. The printing apparatus according to claim 15, wherein the first pixel and the second pixel are pixels that continue concerning the first direction, and concerning the first direction, the second pixel is a pixel located at a position where image formation is possible first in the image forming region.

17. The printing apparatus according to claim 15, wherein by drive of the drive unit using the first pulse, none of the plurality of color development layers develops the color at the position of the first pixel.

18. The printing apparatus according to claim 15, wherein the first pixel is a white pixel.

19. The printing apparatus according to claim 15, wherein when the desired color development layer includes a plurality of color development layers, to preheat a color development layer located at a deep position, the control unit reduces the duty ratio of the first pulse or shortens the application time of the first pulse.

20. The printing apparatus according to claim 15, wherein based on the image data used for image formation in the second pixel, the control unit changes a value of the first pixel from white to a value that does not cause the plurality of color development layers to develop the colors.

21. The printing apparatus according to claim 20, wherein when a value of the second pixel and the value of the first pixel have a specific combination, the control unit performs a control of preheating by the first pulse.

22. The printing apparatus according to claim 15, further comprising an acquisition unit configured to acquire a heat history of the first pixel, wherein based on the heat history acquired by the acquisition unit, the duty ratio of the first pulse is reduced, or the application time of the first pulse is shortened.

23. A print control method of a printing apparatus configured to heat, by a printhead including a plurality of heating elements, a sheet-shaped print medium in which a plurality of color development layers that develop colors in accordance with heating are stacked in correspondence with a plurality of colors so as to form an image on the print medium by causing a desired color development layer of the plurality of color development layers to develop the color, comprising:

when driving each of the plurality of heating elements of the printhead using a first pulse for preheating a predetermined color development layer, and a second pulse applied after the first pulse to cause the predetermined color development layer to develop the color, performing a control in which the first pulse is used in a first pixel that is located in an image non-forming region of the print medium, and the second pulse is used in a second pixel that is located in an image forming region of the print medium and is to be printed after the first pixel; and performing, based on input image data, changing a duty ratio of the first pulse used at a position of the first pixel and/or changing an application time of the first pulse in a case where the color development layer to be caused to develop the color at a position of the second pixel is a first color development layer and in a case where the color development layer to be caused to develop the color is a second color development layer different from the first color development layer.

* * * * *